US011172665B2

(12) United States Patent
McQuade

(10) Patent No.: US 11,172,665 B2
(45) Date of Patent: Nov. 16, 2021

(54) ROTATABLE FISHING ROD HOLDER

(71) Applicant: Evolution International Holdings Pty Ltd, Edge Hill (AU)

(72) Inventor: James Arthur McQuade, Brisbane (AU)

(73) Assignee: Evolution International Holdings Pty Ltd, Edge Hill (AU)

( * ) Notice: Subject to any disclaimer, the term of this patent is extended or adjusted under 35 U.S.C. 154(b) by 55 days.

(21) Appl. No.: 15/738,705

(22) PCT Filed: Dec. 12, 2016

(86) PCT No.: PCT/AU2016/051222
§ 371 (c)(1),
(2) Date: Dec. 21, 2017

(87) PCT Pub. No.: WO2017/100834
PCT Pub. Date: Jun. 22, 2017

(65) Prior Publication Data
US 2018/0177174 A1    Jun. 28, 2018

(30) Foreign Application Priority Data

Dec. 15, 2015 (AU) .................................. 2015905198

(51) Int. Cl.
*A01K 97/10* (2006.01)
*F16B 9/02* (2006.01)
(Continued)

(52) U.S. Cl.
CPC .............. *A01K 97/10* (2013.01); *B63B 25/28* (2013.01); *F16B 9/052* (2018.08); *F16B 9/056* (2018.08);
(Continued)

(58) Field of Classification Search
CPC ........ A01K 97/10; B63B 25/28; B63B 17/04; F16B 9/026; F16C 11/06; F16C 11/10
See application file for complete search history.

(56) References Cited

U.S. PATENT DOCUMENTS 1,880,098 A * 9/1932 Mair ...................... H02G 3/06
285/184
3,193,228 A * 7/1965 Chion ..................... B63B 17/04
256/69
(Continued)

FOREIGN PATENT DOCUMENTS

| ES | 1067608 U | 6/2008 |
| WO | WO2015085366 A1 * | 6/2015 |
| WO | 2017100834 A1 | 6/2017 |

OTHER PUBLICATIONS

Notfication of Transmittal of the International Search Report and The Written Opinion of the International Searching Authority, or the Declaration, International Search Report and Written Opinion for International Application No. PCT/AU2016/051222, entitled: "Rotatable Fishing Rod Holder," dated Feb. 20, 2017.

*Primary Examiner* — Tan Le
(74) *Attorney, Agent, or Firm* — Hamilton, Brook, Smith & Reynolds, P.C.

(57) ABSTRACT

A rotatable flush mounted fishing rod holder including a rod holding tube with an annular flange extending radially from an upper end thereof, and an annular cover member to attach relative to a surface over the annular flange to hold the rod holding tube to the surface but allow rotation of the rod holding tube relative thereto.

22 Claims, 24 Drawing Sheets

(51) Int. Cl.
    *F16C 11/06*     (2006.01)
    *F16C 11/10*     (2006.01)
    *B63B 25/28*     (2006.01)
    *F16B 9/00*     (2006.01)
    *B63B 17/04*     (2006.01)

(52) U.S. Cl.
    CPC .............. *F16C 11/06* (2013.01); *F16C 11/10* (2013.01); *B63B 17/04* (2013.01)

(56) References Cited

U.S. PATENT DOCUMENTS

| | | | |
|---|---|---|---|
| 3,645,057 A * | 2/1972 | Kaplan | E04H 12/2284 |
| | | | 52/295 |
| 5,163,244 A | 11/1992 | Rupp | |
| 5,987,803 A * | 11/1999 | White | A01K 97/10 |
| | | | 43/21.2 |
| 6,067,740 A | 5/2000 | Alley | |
| D499,789 S | 12/2004 | Bridgewater | |
| 6,957,832 B1 * | 10/2005 | Pannekoek | E04H 12/187 |
| | | | 285/184 |
| D586,006 S * | 2/2009 | Pannekoek | D25/126 |
| 7,909,636 B2 * | 3/2011 | Brodeur | H02G 3/06 |
| | | | 285/181 |
| 8,814,221 B2 * | 8/2014 | Grant | H02G 1/00 |
| | | | 285/153.1 |
| 2003/0182842 A1 | 10/2003 | Ruiz et al. | |
| 2006/0086877 A1 * | 4/2006 | Cotton | A01K 97/10 |
| | | | 248/311.2 |
| 2007/0157863 A1 | 7/2007 | Wilcox et al. | |
| 2008/0087211 A1 * | 4/2008 | Sutherland | A01K 97/10 |
| | | | 114/364 |
| 2014/0115947 A1 | 5/2014 | Wilcox et al. | |

\* cited by examiner

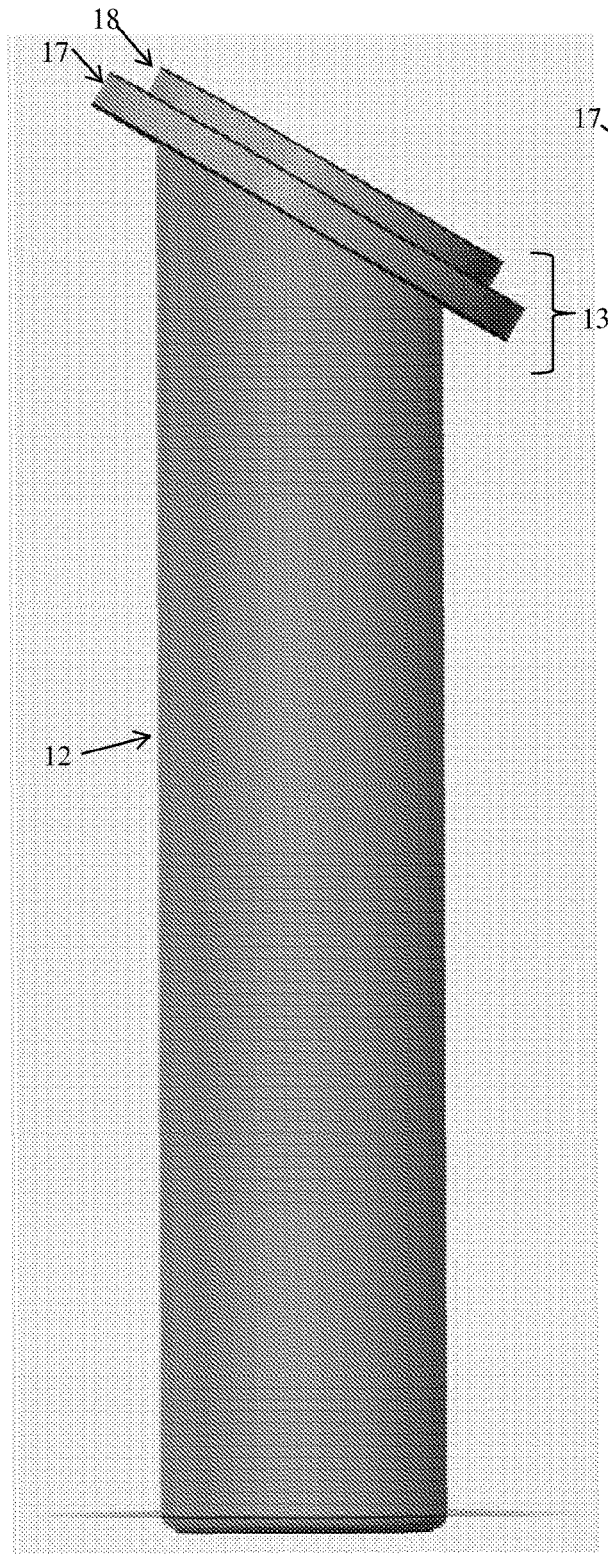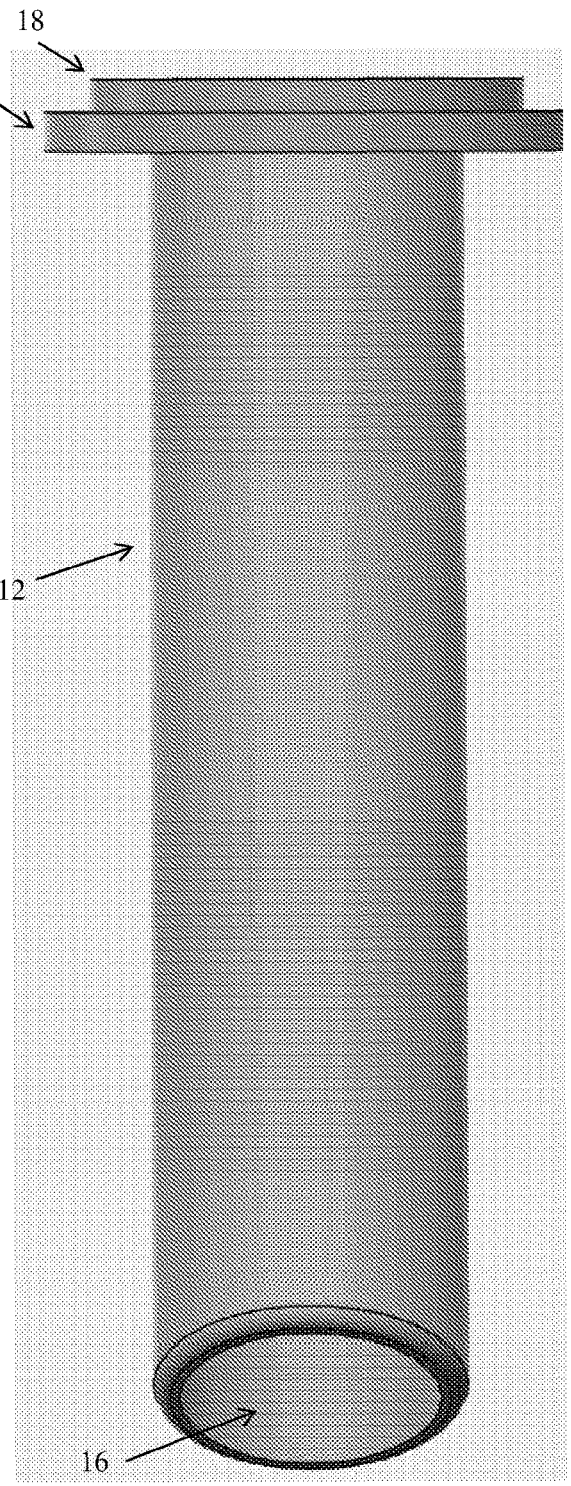
Figure 12                    Figure 13

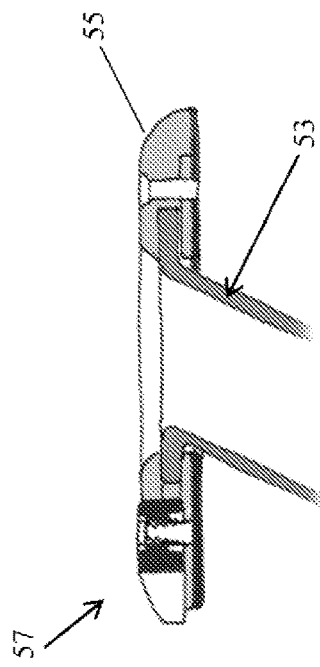
Figure 36
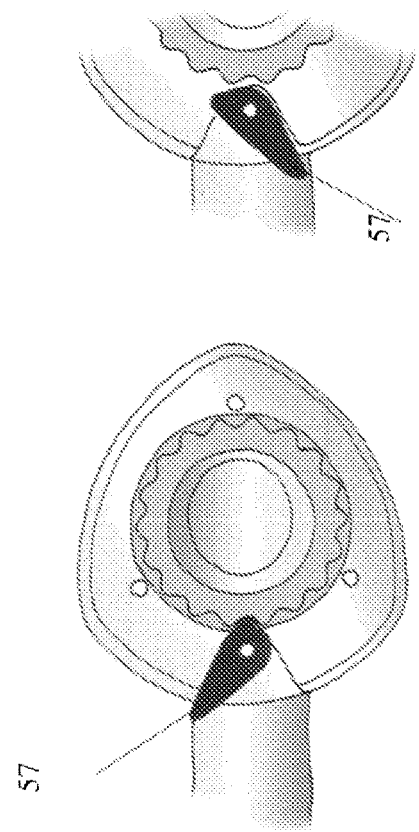
Figure 38
Figure 37
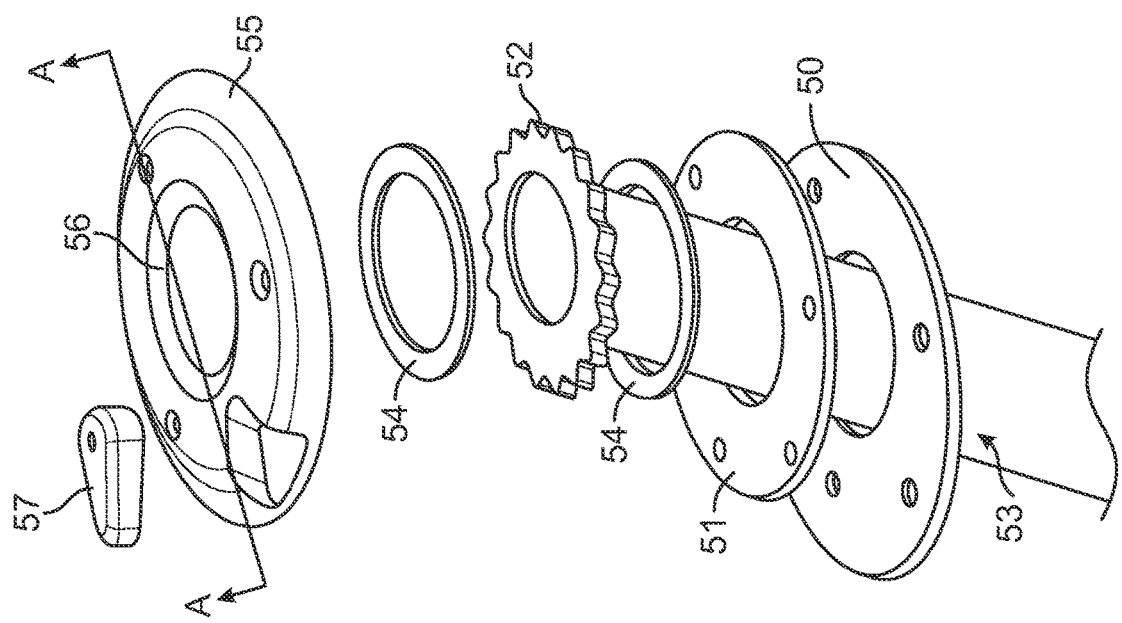
Figure 35

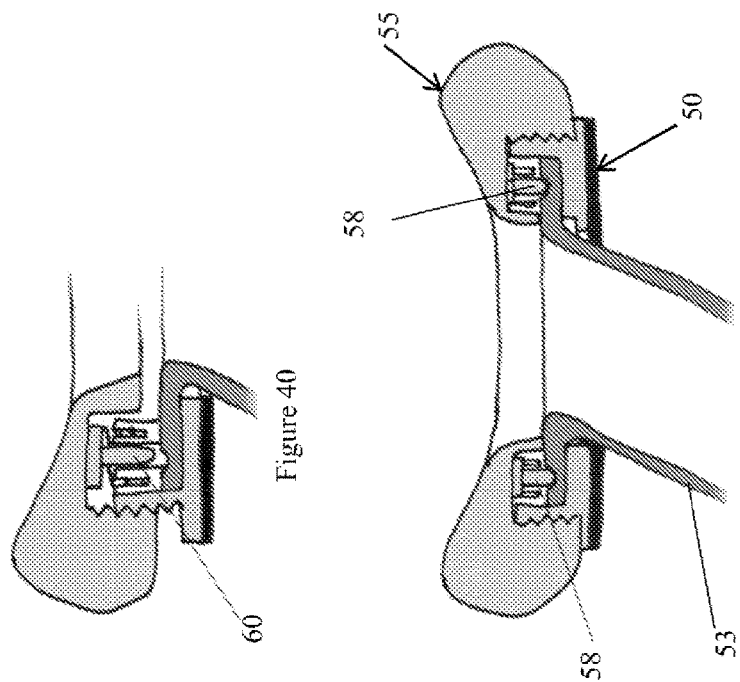
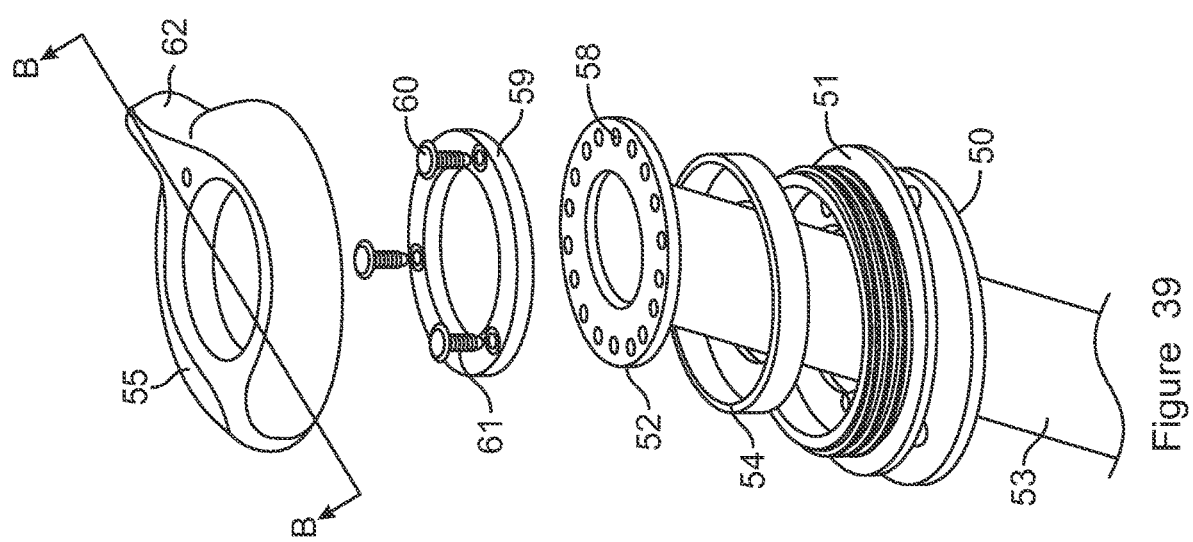

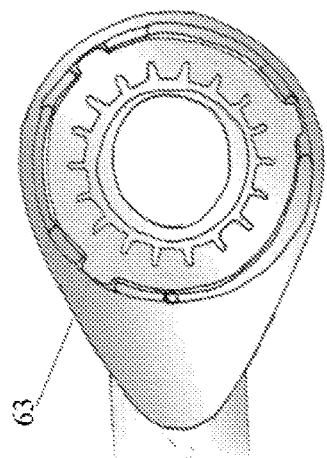
Figure 43
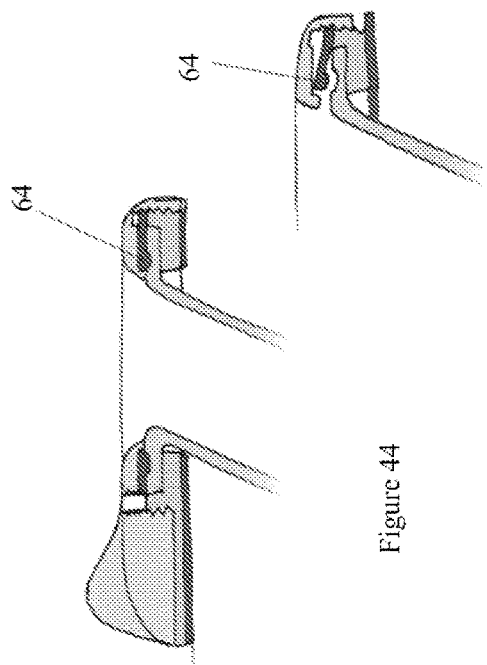
Figure 44
Figure 45
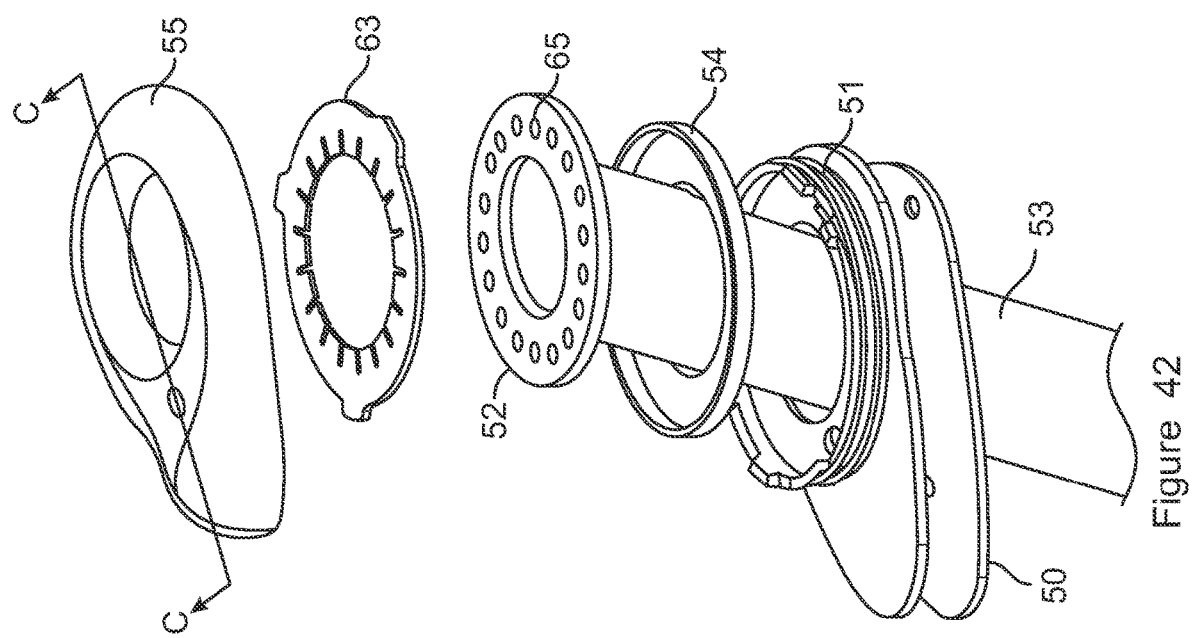
Figure 42

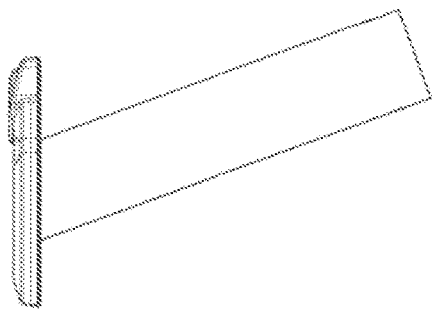
Figure 52
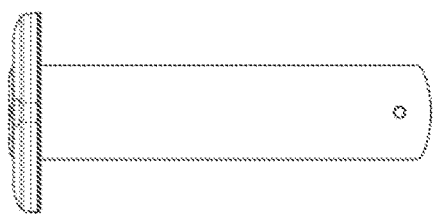
Figure 50
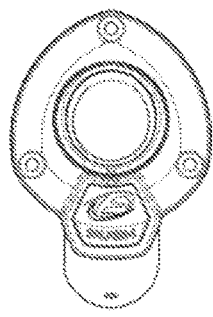
Figure 53
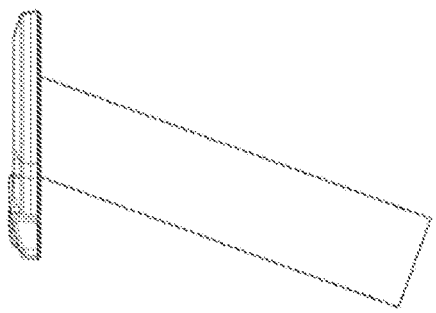
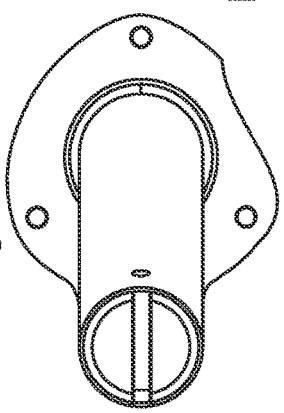
Figure 51
Figure 54

ROTATABLE FISHING ROD HOLDER

This application is the U.S. National Stage of International Application No. PCT/AU2016/051222, filed Dec. 12, 2016, which designates the U.S., published in English, and claims priority under 35 U.S.C. §§ 119 or 365(c) to Australian Patent Application No. 2015905198, filed Dec. 15, 2015. The entire teachings of the above applications are incorporated herein by reference.

TECHNICAL FIELD

The present invention relates generally to the field of fishing apparatus and particularly to a rotatable flush mounted fishing rod holder for installation into the gunwale of a boat or watercraft.

BACKGROUND ART

Known fishing rod holders for installation into the gunwale of a boat or watercraft are installed in a fixed non-adjustable position. They are generally canted or inclined rearwardly relative to the normal direction of travel.

Known fishing rod holders suffer from a large number of problems. As they are non adjustable, they hold the rods fixed in one position. The rods generally need to be removed for rig adjustment or re rigging as well as to boat a catch. When trolling rods are set in one position which can result in entanglement. Also, when travelling, the rods protrude laterally outside the craft which can result in damage to rods and/or the craft Still further, when fishing and a fish strikes, the rod can be in a compromised position when under load which can result in damage to rod and loss of catch.

Yet further, fasteners on top of the gunnel are more exposed to the elements resulting in corrosion.

It will be clearly understood that, if a prior art publication is referred to herein, this reference does not constitute an admission that the publication forms part of the common general knowledge in the art in Australia or in any other country.

SUMMARY OF INVENTION

The present invention is directed to a rotatable flush mounted fishing rod holder, which may at least partially overcome at least one of the abovementioned disadvantages or provide the consumer with a useful or commercial choice.

With the foregoing in view, the present invention in one form, resides broadly in a rotatable flush mounted fishing rod holder including
   a) a rod holding tube with an annular flange extending radially from an upper end thereof,
   b) an annular member for abutting of an underside of the annular flange and
   c) an annular cover member to attach relative to a surface over the annular flange to hold the rod holding tube to the surface but allow rotation of the rod holding tube relative thereto.

In another broader form, the present invention resides in a rotatable flush mounted fishing rod holder including a rod holding tube with an annular flange extending radially from an upper end thereof, and an annular cover member to attach relative to a surface over the annular flange to hold the rod holding tube to the surface but allow rotation of the rod holding tube relative thereto.

In another form, the present invention resides in a rotatable flush mounted fishing rod holder including
   a) a rod holding tube with an annular flange extending radially from an upper end thereof,
   b) an annular member for engaging with the rod holding tube to attach relative to a surface to hold the rod holding tube to the surface but allow rotation of the rod holding tube relative thereto.

The rod holding tube of the present invention will preferably include a bore, normally centrally located through the tube. The bore may be of any internal cross-sectional shape but will normally be substantially circular.

The rod holding tube of the present invention is preferably elongate. The length of the elongate rod holding tube may vary in order to securely receive rods of different lengths although the length of the elongate rod holding tube will typically vary according to the internal and/or external dimension of the rod holding tube.

The rod holding tube will preferably be generally circular in cross-sectional shape although other shapes may be used.

A radially extending flange is preferably provided at an upper end of the rod holding tube. According to a particularly preferred embodiment, the radially extending flange will typically be stepped having an outer, a lower annular portion and an inner, higher annular portion.

The rod holding tube will preferably be provided with a shaped inlet or opening at an upper end thereof, through the radially extending flange. The inlet will normally be provided with a tapered portion. According to the most preferred embodiment, a portion of the bore will preferably be provided tangentially to one side of the tapered opening and a tapered wall will normally be provided about the remainder of the upper end of the bore.

The rod holding tube is preferably unitary in construction. Typically, the rod holding tube will be provided in one of a number of predetermined sizes to accept different diameter round butts.

The lower end of the rod holding tube can be closed or open. It is particularly preferred that a laterally extending pin or similar may be provided across the lower end of the rod holding tube in order to stop the rod extending past the lateral pin. The laterally extending pin or similar will also typically function as a gimbal engagement for the lower end of a rod.

The rod holding tube may be manufactured of any material or combination of materials and although metal could be used, a plastic material is preferred. Normally, if provided, the laterally extending pin or similar will be manufactured from metal.

The radially extending flange will normally be provided at an angle to the longitudinal axis of the rod holding tube itself. The angle of the radially extending flange relative to the longitudinal axis of the rod holding tube will normally define the rest angle of the rod.

Generally, the rod holding tube angle has varying degrees of inclination relative to the gunwale such as substantially 90 degrees, but inclinations of 75 degrees and 60 degrees will be more preferred.

The present invention also includes a cover member. The cover member will preferably be generally circular although other shapes could be used. The cover member will preferably be provided with a central opening there through. The central opening will preferably be dimensioned to receive the inner, higher stepped portion of the radially extending flange of the rod holding tube closely within, normally in abutment and an upper surface of the higher stepped portion of the radially extending flange will preferably be flush with an upper extremity of the cover member.

The cover member will preferably be provided with an arcuate top surface and a depending, circumferentially extending skirt. Normally, the skirt will define a step within the cover member to correspond with the step shape of the radially extending flange of the rod holding tube.

Preferably, one or more receiving openings or assemblies are provided about the skirt in order to receive fasteners to attach the cover member to the gunwale. Normally, the receiving openings or assemblies are provided relative to an underside of the skirt. It is particularly preferred that the receiving openings or assemblies extend into but not through the cover member although in some configurations, the openings may extend through the cover member in order to receive fasteners from above the cover member.

According to a most preferred embodiment, the inner step of the cover member will abut the lower, outer step of the radially extending flange provided on the rod holding tube. In this way, the radially extending flange of the rod holding tube will be sandwiched between the surface relative to which the rod holder is attached and the cover member. Normally, the friction between the surface will act to allow rotation but minimise movement of the rod holding tube.

The cover member may be metal or plastic and will typically be unitary.

In some embodiments, the present invention will include a friction member located between the surface relative to which the rod holder is attached and an underside of the radially extending flange. Preferably, the friction member will be a substantially planar, annular disc. An opening will normally be provided through the friction member in order to receive the rod holding tube.

An upper surface of the friction member will normally abut a lower surface of the radially extending flange on the rod holding tube and a lower surface of the friction member will normally abut an upper surface of the gunwale. In this way, the friction member will typically be sandwiched between the surface and the radially extending flange of the rod holding tube.

The friction member may be provided in a low friction or high friction configuration. Further, one surface of the friction member may be low friction on the opposite surface may be high friction. This will preferably allow movement in particular configurations and/or prevent/minimise movement in other configurations.

One or more openings will normally be provided through the friction member in order to allow the preferred fasteners to pass through the friction member. The friction member will typically be similarly sized to the external diameter of the skirt of the radially extending flange.

Fasteners may be installed from the lower side upwardly into or through the cover member or alternatively, the fasteners may extend downwardly through the cover members although this is less preferred as it leaves the fasteners exposed. The fasteners will typically have the form of elongate, threaded members such as screws or bolts but other fastening assemblies may be used.

The assembly may further include a second member preferably a disc of similar shape and dimensions to the friction member for reinforcing or stabilising the assembly. This second member will preferably be provided to strengthen the assembly. Normally, the second member is located under the panel/gunwale of the water craft. Preferably, the fasteners will extend through the second member, through the panel/gunwale of the water craft, through the friction member and into the underside of the cover member.

The cover member and/or rod holding tube may be constructed out of various plastics, alloys and stainless steels, as well as timbers, fibreglass, Kevlar, carbon fibre or any other materials of reasonable manufacturing strength. Preferably, this invention will be made of anodised aluminium or powder-coated aluminium of varying colours and patterned or polished designs where exposed, particularly the cover member.

The rod holding tube will preferably be made of ABS plastic materials or similar, but other materials could be used.

The friction member will preferably be made of a softer wearing type material such as nylon, but not excluding other types of wearing materials, including rubbers or soft metals or the materials used for the cover member and/or rod holding tube. The second disc is preferably a reinforcing/stabilizing disc and of a similar nature to the friction member but can be made of any of the aforementioned materials.

According to a preferred embodiment, the cover may be provided with a bevelled or rolled inner edge which allows the cover to mate with or be flush with an arcuate portion of the bore at the upper end of the rod holding tube, rather than receiving a portion or step of the radially extending flange of the rod holding tube at an upper end in order to be flush with that portion. The difference is largely one of aesthetics but a rolled or bevelled edge provided on the inner edge of the cover may reduce damage to the rod holding tube, particularly if the cover is made of a material such as metal and the rod holding tube is made of plastic for example. In this embodiment, the underside of the cover will normally have a stepped profile in order to match the stepped profile of the radially extending flange of the rod holding tube so as to allow rotation of the rod holding tube relative to the cover.

According to an alternative embodiment, the cover may attach to an annular member in order to cover fasteners. For example, an annular member may be provided above the radially extending flange of the rod holding tube and be attached to or mounted to a second member below the surface relative to which the apparatus is mounted. In practice, the attachment or mounting can be achieved using one or more fasteners extending into or through both the annular member and the second member. If the fasteners are installed through the annular member on top of the surface, then it is preferred that a cover is provided in order to cover the annular member and provide an aesthetically pleasing finish to the flush mounted rod holder and cover the fasteners. Where provided in this form, it is preferred that an underside of the annular member is preferably stepped to correspond to the shape of the radially extending flange provided on the rod holding tube. The cover can engage with the annular member in any way such as by snap fitting over the annular member but preferably, an external thread is provided on the annular member and a corresponding thread is provided on a lower portion of the inside of the cover to allow the cover to be threaded onto the annular member. This particular embodiment may be advantageous in that the fasteners can be inserted from above the level of the surface rather than below and the cover can simply be removed in order to adjust the force required to rotate the rod holding tube and then replaced Wendy adjustment is complete. This may provide a more easily accessible and adjustable assembly.

According to aspects of the present invention, different thickness friction/tension members may be provided and/or one or more additional annular members of different thicknesses may be provided in order to adjust the clamping force exerted on the rod holding tube in order to adjust the ease of rotation of the rod holding tube. The members may be provided with openings either into or through depending upon the configuration of fasteners used and depending upon the required attachment between the members.

In one alternative embodiment of the present invention, a rod holding tube with a radially extending flange and with a shaped upper surface can be provided in order that only a single component of the flush mounted rotatable rod holder is provided above the surface. In this way, the rod holding tube is inserted through the mounting opening in the surface until the underside of the radially extending flange abuts an upper side of the surface and the shaped upper surface will provide the flush mounting with the surface and lead to the bore of the rod holding tube. In this embodiment, an annular member which is engageable with the rod holding tube and preferably, with the radially extending flange of the rod holding tube is provided on an underside of the surface in order to sandwich the surface between the underside of the radially extending flange and the annular member. In this embodiment, the radially extending flange of the rod holding tube is preferably provided with part of a bayonet engagement fitting and the annular member is preferably provided with an upstanding neck surrounding the opening of the annular member and provided with a corresponding portion of the bayonet engagement fitting such that the rod holding tube is inserted through the mounting opening in the surface and the annular member is located thereabouts from below with the upstanding neck extending through the mounting opening whereby the upstanding neck and more particularly the corresponding portion of the bayonet engagement fitting can engage with the part of the bayonet engagement fittings provided on the rod holding tube in order to attach the components together. In this preferred embodiment, two components are provided with the components utilising a bayonet engagement fitting to engage with one another whereby the two can be rotated relative to one another to lock and unlock the components from one another. Either the radially extending flange and/or the annular member may be provided with one or more angled or inclined walls or portions such that the action of relative rotation of the two components will act to draw the two components toward one another and twisting to unlock the components, forces the two components to move apart.

In this embodiment, the bayonet engagement portion normally includes a one or more tongues extending radially away from the near received in corresponding openings in an underside of the radially extending flange with an enlarged wall portions separating the openings in the radially extending flange such that the tongues can be inserted into the openings when aligned and to the components can be locked together when the 2 components are rotated relative to one another such that the tongues are out of alignment with the openings.

The engagement can be provided with a single, radial tongue.

Other mechanisms such as a ratchet mechanism may be provided in order to allow a user to tighten to a degree and have the components locked relative to one another against normal use but not determined rotation in the opposite direction. Alternatively, one or more fasteners may be provided between the components in order to apply a compression force allowing adjustment of the ease of rotation of the rod holding tube.

In an alternative embodiment, the underside of the radially extending flange may include a track in order to receive one or more planar plate members associated with a threaded fastener. Typically, more than one planar plate and fastener assembly are provided spaced around the radially extending flange. The fastener is typically received through an annular member provided on the underside of the surface relative to which the rod holder is mounted and then into the plate. This will typically allow a user to not only attach the annular member to the radially extending flange but also adjust the compression force applied in order to adjust the amount of force required to rotate the rod holder in situ.

In yet another alternative embodiment, a tensioning element may be provided. The tensioning element according to a preferred embodiment is an annulus which can be rotated in order to adjust the force required to rotate the rod holding tube. In particular, the preferred annulus is provided with at least one, and normally a number of slot openings in order to receive fasteners there through but still allow rotation of the tensioning element relative to the fasteners and one or more angled surfaces on the upper and/or lower side of the element, adjacent each of the slot openings such that a portion of the fastener received through the slot opening rides on the one or more angled surfaces. Typically, the head of the fastener will abut the one or more angled surfaces such that rotation of the tensioning element in a first direction will result in the head riding on the inclined surface to force the fasteners away from the component that the fasteners are attached to, normally a component above the surface, which in turn draws that component closer to the surface and increases the force required to rotate the rod holder, and rotation in the opposite direction results in the heads of the fasteners riding on the inclined surfaces to allow the component that the fasteners are attached to, normally the component above the surface, which in turn allows that component to be loosened relative to the surface, decreasing the force required to rotate the rod holder. According to a particularly preferred embodiment, an inner and an outer inclined surface is provided relative to each slot and normally there are a number of slots, one for each of the fasteners.

This flush mount rotatable rod holder also has the scope to be mounted in association with a motorised electric drive system for powered rotation of the rod holder to any position, potentially by a remote control device. It is preferred that an electric motor is provided with an output member shaped to engage with the rod holding tube, and preferably a portion of the radially extending flange of the rod holding tube. Preferably, the output member is substantially T-shaped when viewed from the side with a preferably circular upper portion and an elongate arm extending substantially centrally from the preferred circular upper portion. The circular upper portion can be provided with an engagement mechanism in order to engage with a portion of the radially extending flange of the rod holding tube. According to a most preferred embodiment, an edge of the preferred circular upper portion of the output member abuts or engages a portion of the radially extending flange, preferably an outer side edge of the radially extending flange. Preferably, the edge of the preferred circular upper portion of the output member and/or the outer side edge of the radially extending flange may have engagement portions provided thereon. In one form, the engagement portions may include one or more teeth but it is anticipated that the engagement between the edge of the preferred circular upper portion of the output member and the outer side edge of the radially extending flange may be friction only. An increased friction portion may be provided on the edge of the preferred circular upper portion of the output member and/or the outer side edge of the radially extending flange.

Preferably, the edge of the preferred circular upper portion of the output member will also abut a portion of the cover member and indeed, an annular track may be provided or defined between an outer edge of the radially extending flange of the rod holder and an inner surface of the cover whether these components are provided as 2 separate components or as a single component.

Normally, the preferred electric motor is provided below the surface relative to which the rod holder is mounted and the elongate arm extends upwardly through any flanges or annular member is provided to locate the upper portion of the output member adjacent to the radially extending flange of the rod holding tube. In use, the elongate arm may extend through and be guided by one or more openings provided in the components of the rod holder.

A device may be provided for insertion into the rod holding tube to engage with or lock the gimbal pin and then rotated.

A capped top which acts as a water proof sealing device may be provided for closing the bore when a rod is not in position.

Any one of a variety of mechanisms may be used to at least temporarily lock the rotatable mounted fishing rod holder of the present invention in position or orientation.

In one preferred embodiment, an annular gasket may be provided relative to a gunwale with an annular baseplate located above the gasket. A generally annular flange preferably extends transversely from the rod holding tube. One or more low friction annular guide members may be provided between the generally annular flange and the annular baseplate. One or more low friction annular guide members may also be provided between the generally annular flange and an upper cover plate. The cover plate preferably has an opening substantially centrally located in the cover plate in order to communicate with the rod holding tube. In this preferred embodiment, the generally annular flange will preferably have a shaped locking detail provided on at least one surface, and preferably a circumferential surface of the annular flange. In a particularly preferred embodiment, the locking detail is preferably a scalloped surface having alternating peaks and valleys extending about the circumferential edge of the annular flange. A locking lever is typically provided in association with the cover plate and which is movable between a locked condition, in which a portion of the locking lever and/or a member associated with the locking lever and moved by the locking lever, will engage with the locking detail on the annular flange and an unlocked condition, in which a portion of the locking lever and/or a member associated with the locking lever and moved by the locking lever, will be free from the locking detail. The locking lever will typically be moved manually by an operator in order to release the fishing rod holder for rotation or to lock the position and/orientation of the fishing rod holder as required. Typically, the locking lever will be biased into the locked condition but there may be situations where the locking lever is moved to the unlocked condition and temporarily maintained in that position through a latching mechanism in order to allow the locking lever to be held in the unlocked condition allowing the fishing rod holder to freely rotate until locked by a user by releasing the latching mechanism, and engaging the lever.

In an alternative configuration, the construction of the fishing rod holder may be similar to that described above but instead of the locking detail provided on the annular flange having the above-described form, the locking detail may include one or more locking openings extending into the annular flange typically substantially vertically. In this configuration, a button or similar arrangement may be provided. Preferably, the button will be biased into the locked condition in which a portion of the button or a shaped protrusion associated therewith will engage with the one or more locking openings in order to temporarily lock the fishing rod holder against rotation. The button will typically be mounted for pivotal movement and preferably, the button can be depressed on one edge in order to raise the opposite edge with the shaped protrusion being located on an underside of the button such that depressing one edge of the button also withdraws the shaped protrusion from the one or more locking openings allowing the rod holder to rotate. In this configuration, the annular flange may have one or more locking openings extending into the body of the flange substantially vertically or alternatively, the one or more locking openings may be provided as one or more scalloped surfaces having alternating peaks and valleys extending about the at least a portion of the circumferential edge of the annular flange.

In a further alternative configuration, the annular flange may be provided with one or more locking openings and the cover plate may be threadingly attached relative to the baseplate in order to change the separation distance between an underside of the cover plate and the annular flange. In this particular configuration an annular guide is preferably provided above the annular flange with at least one, and typically a number of locking pins mounted relative thereto. Each of the locking pins will typically be biased into an unlocked condition in which the locking pins are free from the at least one opening in the annular flange but when the cover plate is screwed down towards the annular flange, at least a portion of at least one of the locking pins is preferably forced into engagement with at least one of the openings in the annular flange in order to prevent rotation of the annular flange and thereby prevent rotation of the rod holding tube. The cover plate may be provided with one or more enlarged portions in order to allow a user to more easily grip the cover plate to lock and unlock the cover plate through rotation which will change the separation distance between the underside of the cover plate and the annular flange to either force the locking pins into the locked condition or to allow the pins to be injected from the at least one opening in the annular flange in the unlocked condition.

In yet a further embodiment, the cover plate may be threadingly attached relative to the baseplate in order to change the separation distance between an underside of the cover plate and the annular flange and a spring steel locking plate may be provided between the cover plate and the annular flange. In this embodiment, the spring steel locking plate may engage directly with the annular flange through friction or alternatively, one or more protrusions may be provided on an underside of the locking plate such that when the locking plate is forced onto the annular flange by tightening the cover plate relative to the annular flange, the one or more protrusions may be forced into one or more locking openings or detents provided on a surface of the annular flange.

In configurations where the cover plate is threadingly attached relative to the baseplate in order to change the separation distance between an underside of the cover plate and the annular flange, normally an at least partially threaded upstand is provided relative to the baseplate, potentially integrated with the baseplate and a correspondingly at least partially threaded portion is provided on an underside of the cover plate such that the separation between the cover plate on the annular flange can be changed by tightening or loosening the cover plate relative to the baseplate.

Any of the features described herein can be combined in any combination with any one or more of the other features described herein within the scope of the invention.

The reference to any prior art in this specification is not, and should not be taken as an acknowledgement or any form of suggestion that the prior art forms part of the common general knowledge.

BRIEF DESCRIPTION OF DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows:

FIG. 12 is a side elevation view of the rod holding tube illustrated in FIG. 10.

FIG. 13 is a front elevation view of the rod holding tube illustrated in FIG. 10.

FIG. 35 is an exploded isometric view of a further possible configuration of flush mounted rotating fishing rod holder according to a preferred embodiment.

FIG. 36 is a sectional view of the configuration illustrated in FIG. 35 along line A-A.

FIG. 37 is a top view of the configuration illustrated in FIG. 35 with the cover plate removed in the locked condition.

FIG. 38 is a top view of the configuration illustrated in FIG. 37 in the unlocked condition.

FIG. 39 is an exploded isometric view of a further possible configuration of flush mounted rotating fishing rod holder according to a preferred embodiment.

FIG. 40 is a sectional view of the configuration illustrated in FIG. 39 along line B-B in the unlocked condition.

FIG. 41 is a sectional view of the configuration illustrated in FIG. 39 along line B-B in the locked condition.

FIG. 42 is an exploded isometric view of a further possible configuration of flush mounted rotating fishing rod holder according to a preferred embodiment.

FIG. 43 is a top view of the configuration illustrated in FIG. 42 with the cover plate removed.

FIG. 44 is a sectional view of the configuration illustrated in FIG. 42 along line C-C in the locked condition.

FIG. 45 is a sectional view of the configuration illustrated in FIG. 42 along line C-C in the unlocked condition.

FIG. 50 is a front elevation view of the configuration illustrated in FIG. 46.

FIG. 51 is a right side elevation view of the configuration illustrated in FIG. 46.

FIG. 52 is a left side elevation view of the configuration illustrated in FIG. 46.

FIG. 53 is a plan view of the configuration illustrated in FIG. 46.

FIG. 54 is a bottom view of the configuration illustrated in FIG. 46.

DESCRIPTION OF EMBODIMENTS

Figure 1:
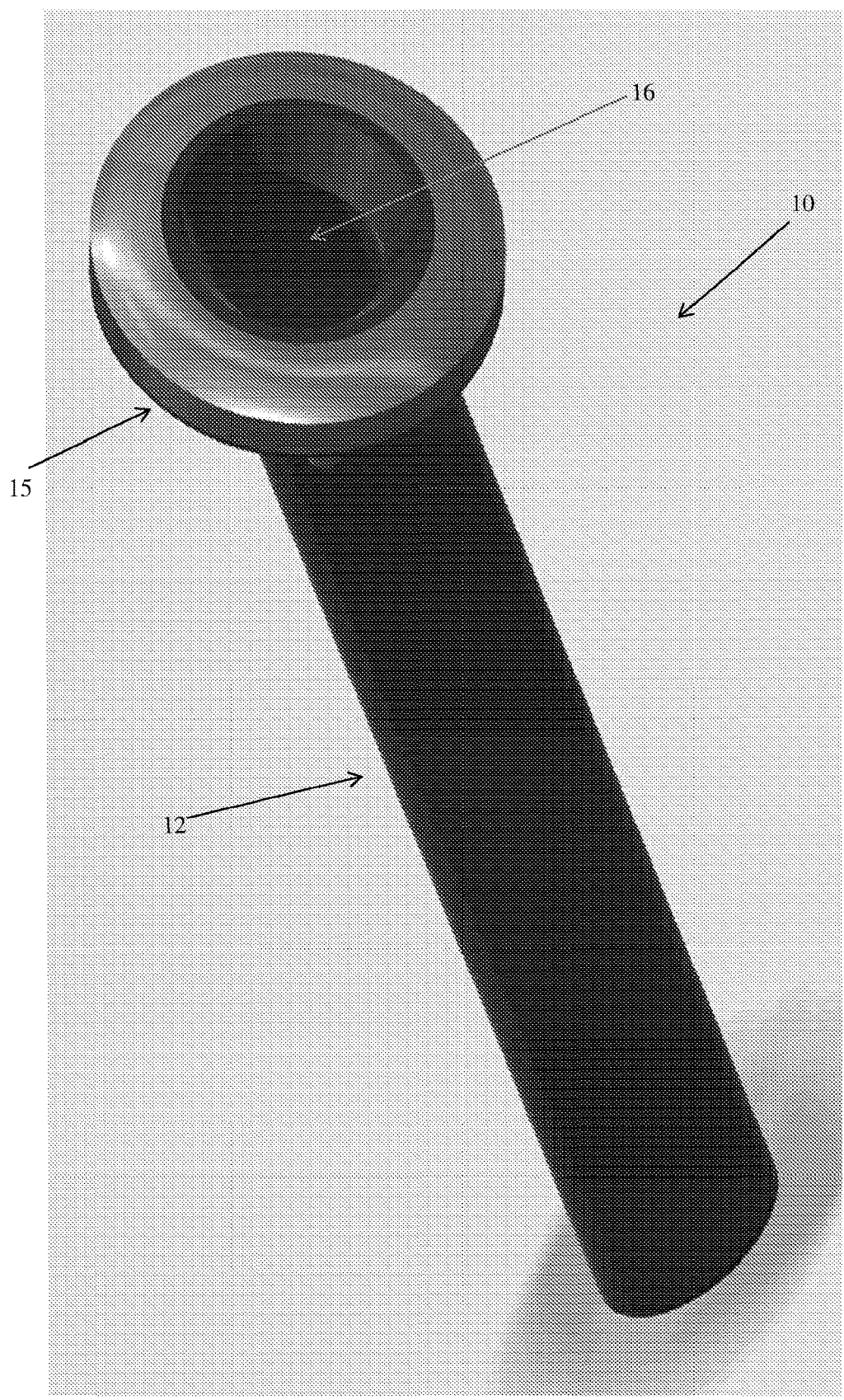
FIG. 1 is an isometric view of a rotatable flush mounted fishing rod holder according to a preferred embodiment of the present invention.
Figure 2:
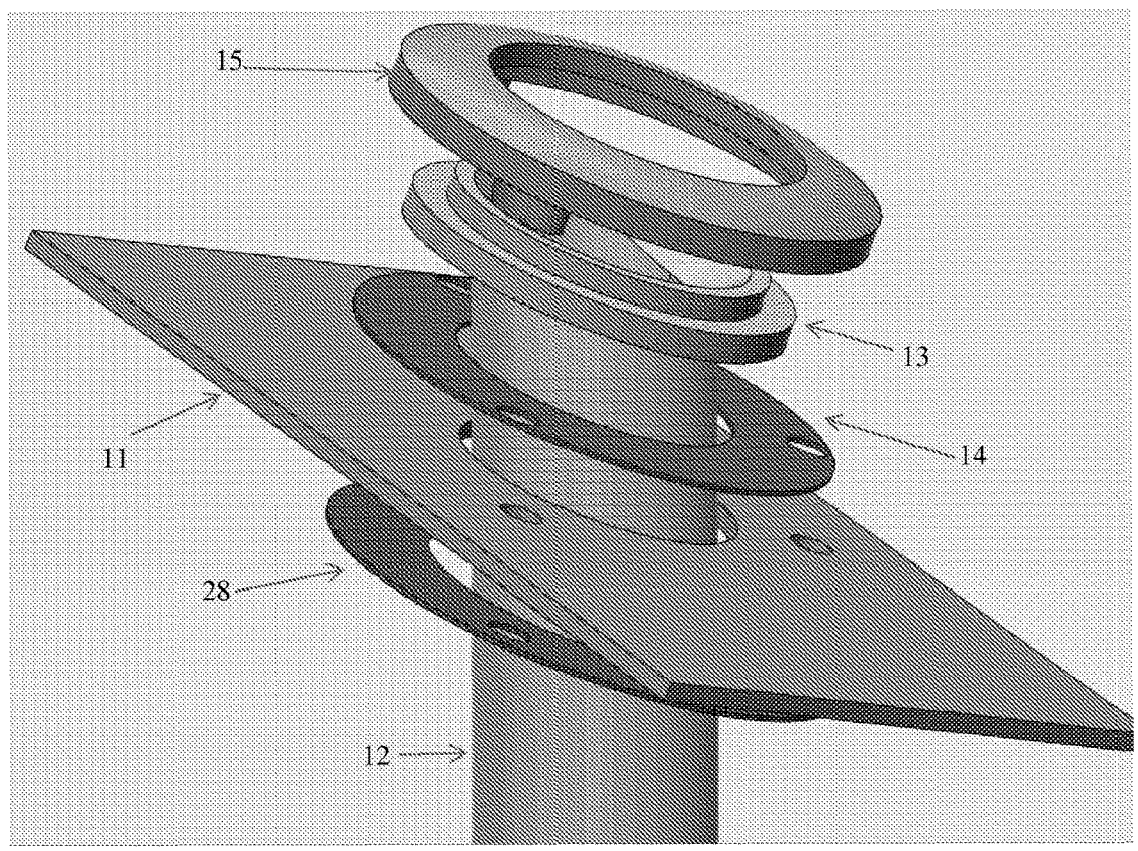
FIG. 2 is an isometric exploded view of the rotatable flush mounted fishing rod holder illustrated in FIG. 1 from the front.
Figure 3:
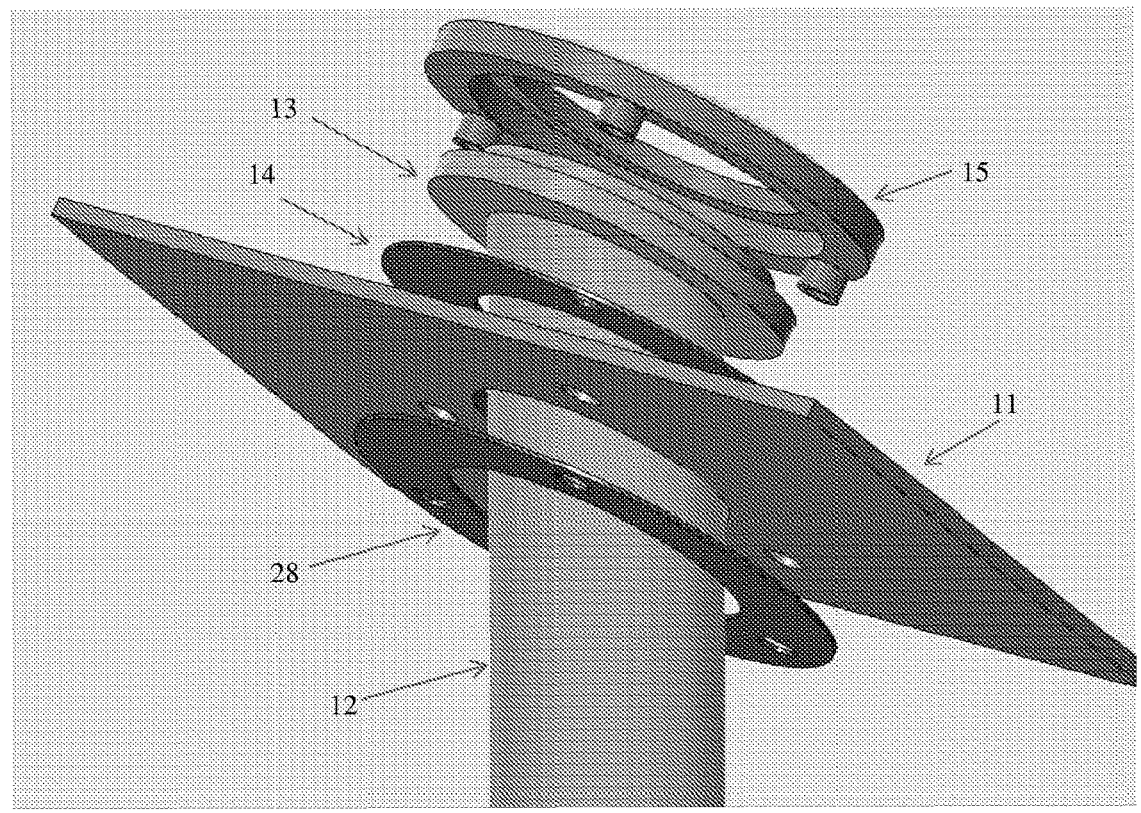
FIG. 3 is an isometric exploded view of the rotatable flush mounted fishing rod holder illustrated in FIG. 1 from the rear.
Figure 4:
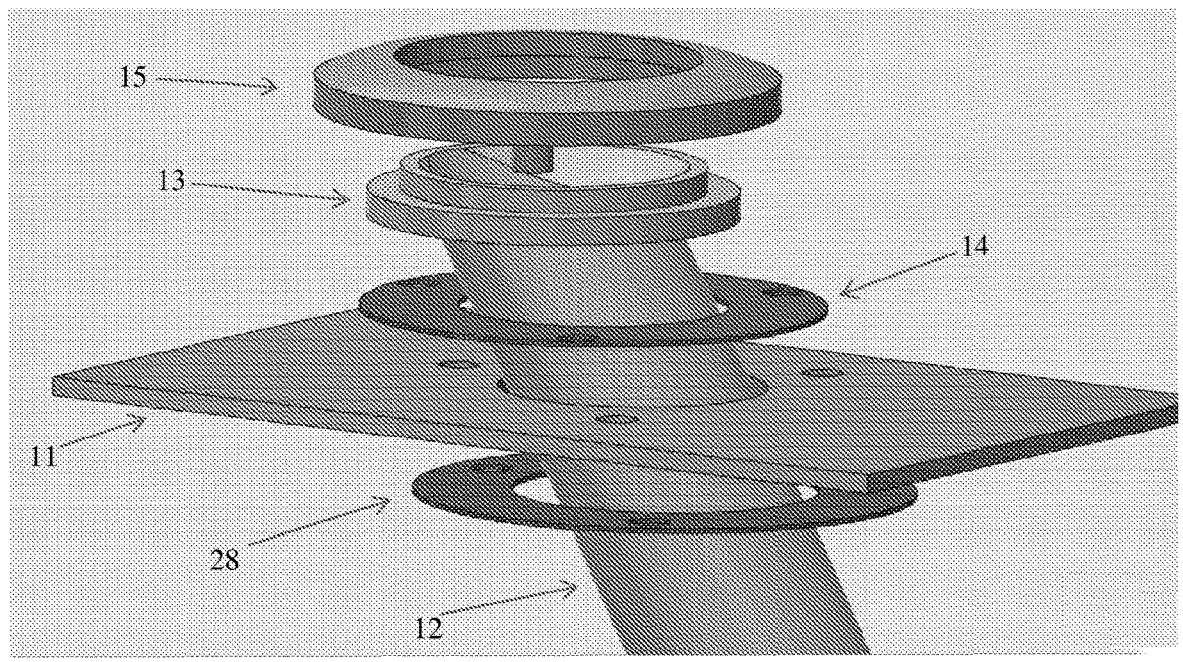
FIG. 4 is an isometric exploded view of the rotatable flush mounted fishing rod holder illustrated in FIG. 1 from the side.
Figure 5:
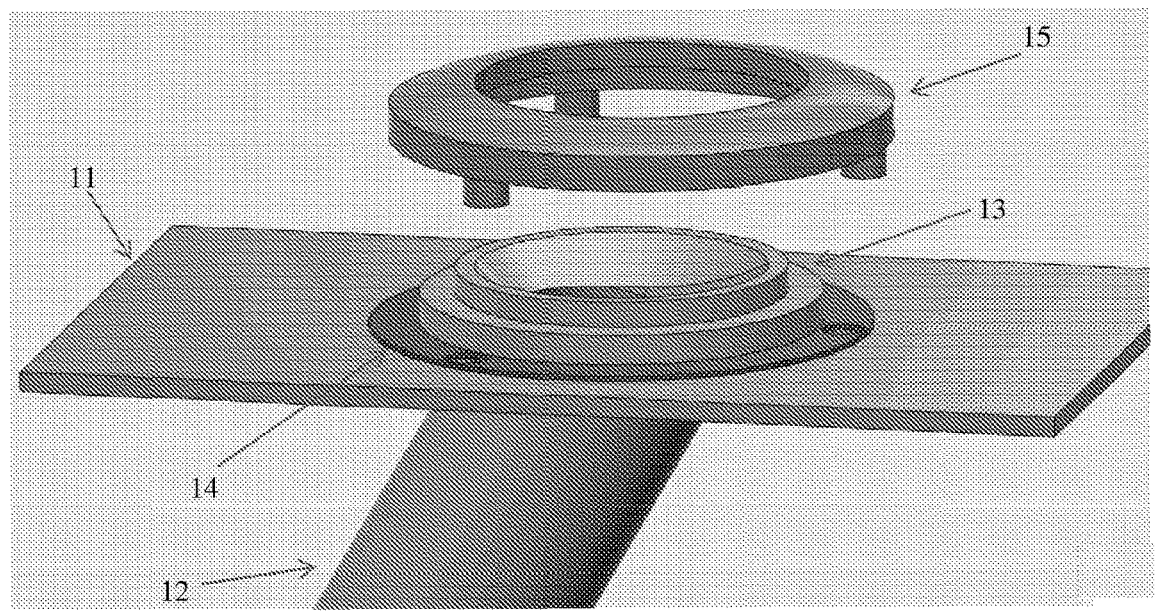
FIG. 5 is an isometric view of a partially assembled fishing rod holder with the cover member removed.
Figure 6:
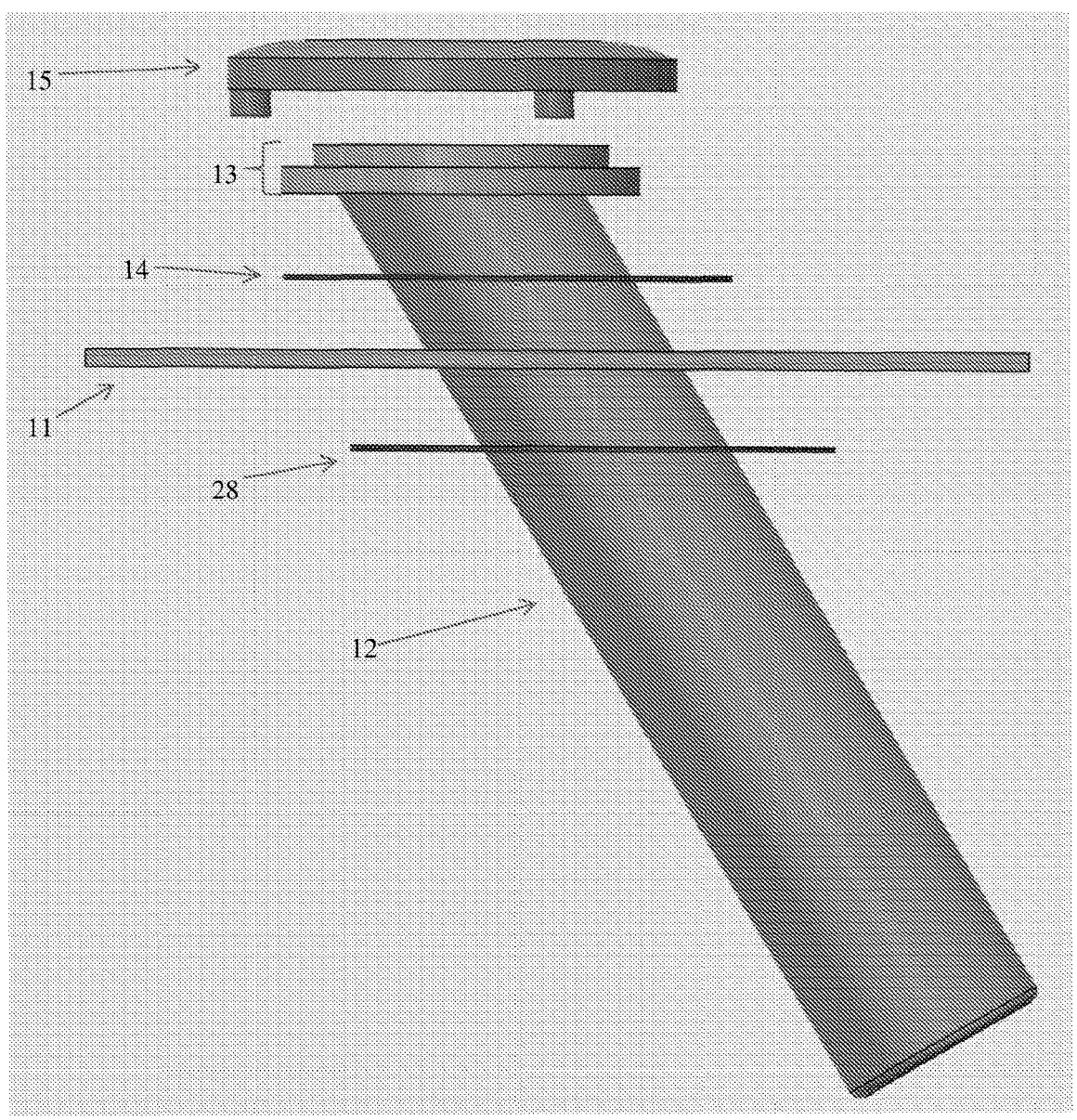
FIG. 6 is an exploded view of the rotatable flush mounted fishing rod holder illustrated in FIG. 1 from the side.

According to a particularly preferred embodiment of the present invention, rotatable fishing rod holder 10 for installation into the gunwale 11 of a boat or watercraft is provided.

In the preferred form illustrated, the rotatable flush mounted fishing rod holder 10 includes a rod holding tube 12 with an annular flange 13 extending radially from an upper end of the rod holding tube 12, an annular friction member 14 for abutting of an underside of the annular flange 13 and an annular cover member 15 to attach relative to the gunwale 11 over the annular flange 13 to hold the rod holding tube 12 to the gunwale 11 but allow rotation of the rod holding tube 12 relative thereto.

The rod holding tube 12 includes a bore 16, normally centrally located through the tube 12. The bore may be of any internal cross-sectional shape but will normally be substantially circular as illustrated.

The rod holding tube 12 is elongate with the length varying in order to securely receive rods of different lengths although the length of the elongate rod holding tube 12 will typically vary according to the internal and/or external dimension of the rod holding tube.

The rod holding tube 12 of the illustrated embodiment is generally circular in cross-sectional shape although other shapes may be used.

A radially extending flange 13 is provided at an upper end of the rod holding tube 12. According to the particularly preferred embodiment illustrated (best seen in FIGS. 10 to 13), the radially extending flange 13 is stepped having an outer, a lower annular portion 17 and an inner, higher annular portion 18.

Figure 10:
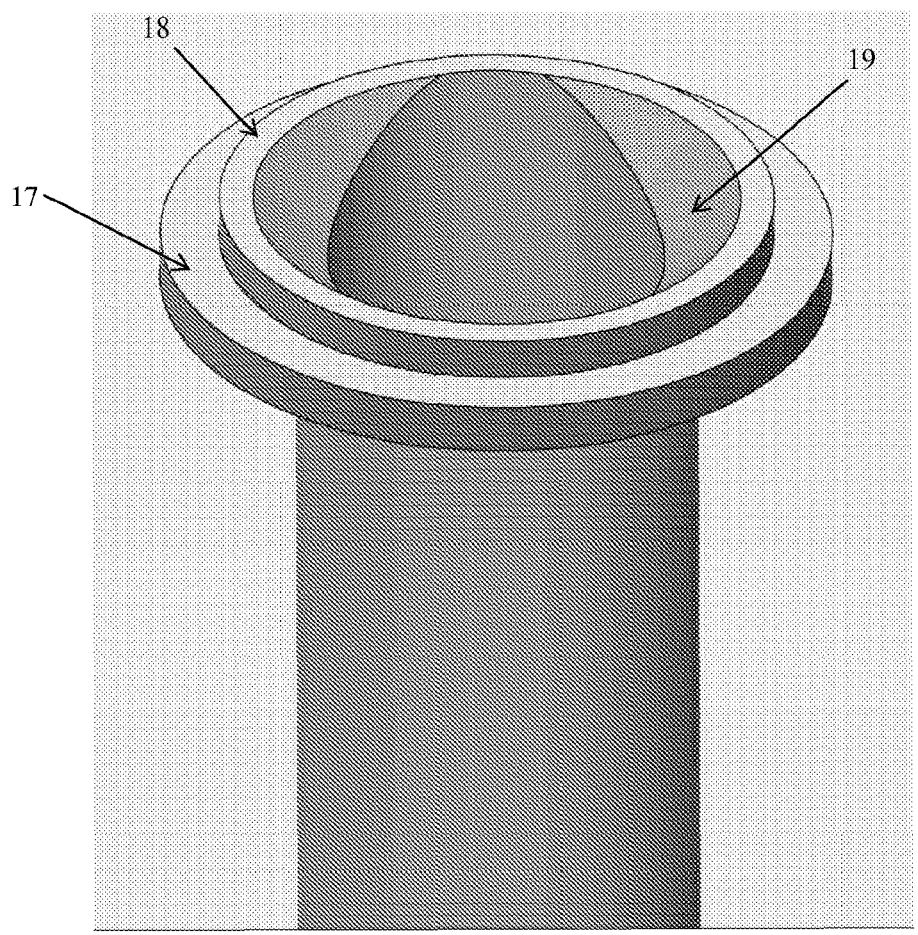
FIG. 10 is an isometric front elevation view of the rod holding tube according to a preferred embodiment of the present invention.
Figure 11:
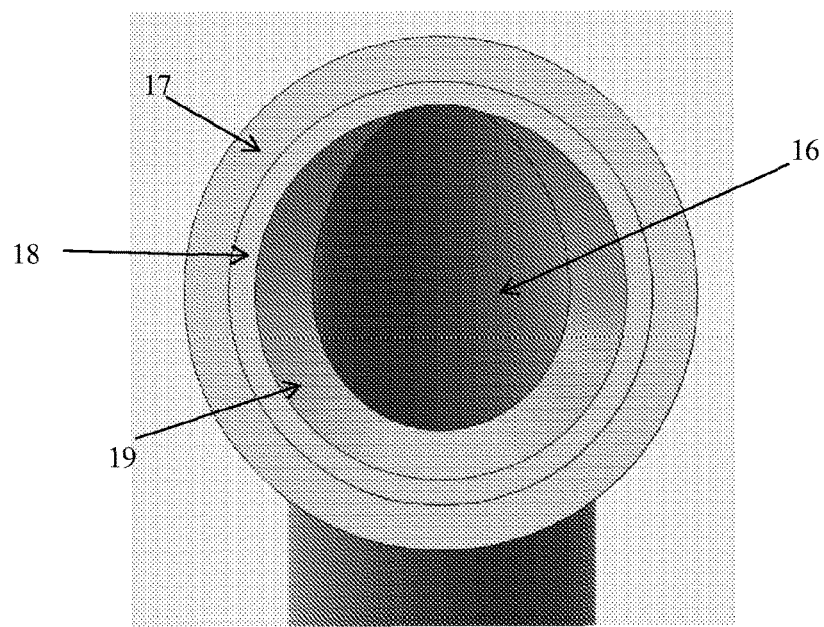
FIG. 11 is a plan view of the rod holding tube illustrated in FIG. 10.

As illustrated in FIGS. 10 and 11 best, the rod holding tube 12 is provided with a shaped inlet or opening at an upper end thereof, through the radially extending flange 13. According to the most preferred embodiment, a portion of the bore 16 provided tangentially to one side of the upper end of the bore and a tapered wall 19 is provided about the remainder of the upper end of the bore 16.

The rod holding tube 12 is preferably unitary in construction.

As illustrated in FIG. 12 in particular, the radially extending flange 13 will normally be provided at an angle to the longitudinal axis of the rod holding tube 12. The angle of the radially extending flange 13 relative to the longitudinal axis of the rod holding tube 12 will normally define the rest angle of the rod.

Generally, the rod holding tube angle has varying degrees of inclination relative to the gunwale 11 such as substantially 90 degrees, but inclinations of 75 degrees and 60 degrees will be more preferred.

Figure 8:
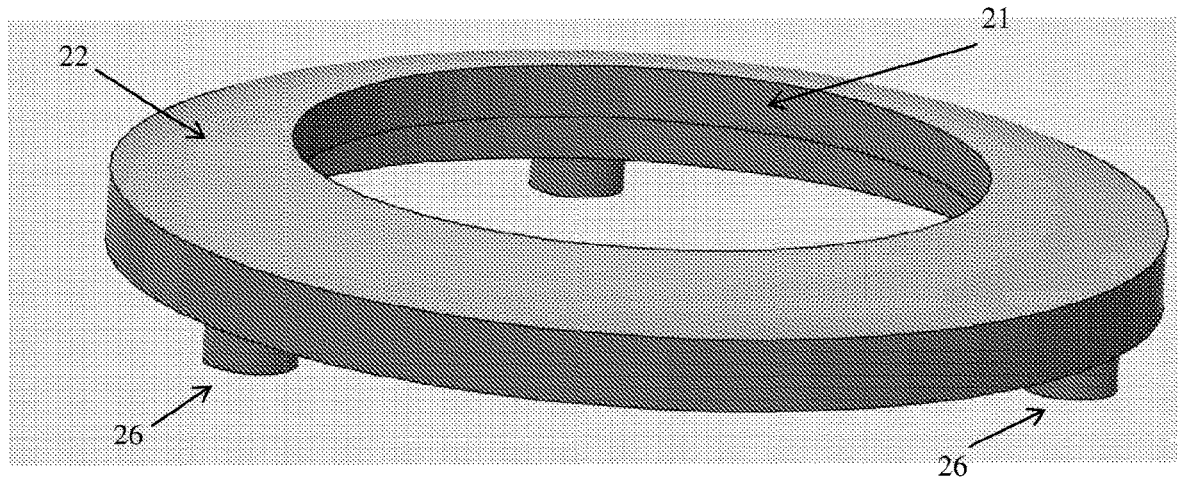
FIG. 8 is an isometric view from above of a cover member according to a preferred embodiment.
Figure 9:
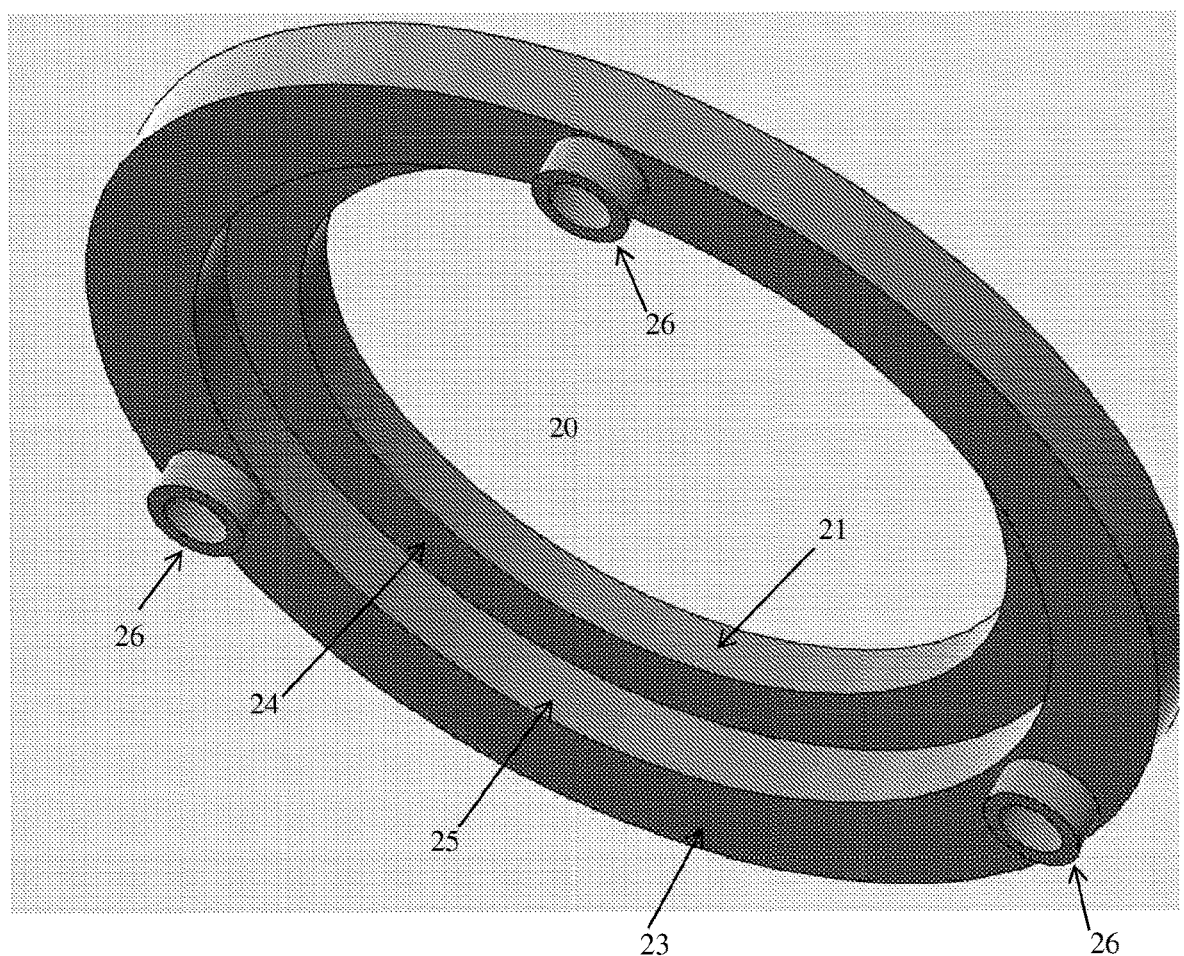
FIG. 9 is an isometric view from below of the cover member illustrated in FIG. 8.

The present invention also includes a cover member 15, one preferred embodiment of which is illustrated in FIGS. 8 and 9. The cover member 15 will preferably be generally circular although other shapes could be used. The cover member 15 will preferably be provided with a central opening 20 therethrough. The central opening is defined by a periphery 21 dimensioned to receive the inner, higher stepped portion 18 of the radially extending flange 13 of the rod holding tube 12 closely within, normally in abutment and an upper surface of the higher stepped portion 18 of the radially extending flange 13 will preferably be flush with an upper extremity of the cover member 15 when properly assembled.

The cover member 15 of the illustrated embodiment is provided with an arcuate top surface 22 and a depending, circumferentially extending skirt 23. As illustrated in FIG. 9, the skirt 23 defines a step within the cover member 15 to correspond with the step shape of the radially extending flange 13 of the rod holding tube 12.

According to a most preferred embodiment, a lower surface 24 of an inner step of the cover member 15 abuts the lower, outer step 17 of the radially extending flange 13 provided on the rod holding tube 12 and an inner surface of a lower step will abut an outer circumferential surface of the lower, outer step 17 of the radially extending flange 13. In this way, the radially extending flange 13 of the rod holding tube 12 is sandwiched between the gunwale 11 relative to which the rod holder 10 is attached and the cover member 15. Normally, the friction between the gunwale 11 will act to allow rotation but minimise movement of the rod holding tube 12.

One or more, preferably three receiving assemblies 26 are provided about the skirt 23 of the cover member 15 in order to receive fasteners (not illustrated) to attach the cover member 15 to the gunwale 11. Normally, the receiving assemblies 26 are provided relative to an underside of the skirt 23 as shown in FIG. 9. It is particularly preferred that the receiving openings in the receiving assemblies 26 extend into but not through the cover member 15. The receiving assemblies illustrated are at least partially received in complementary openings 27 provided in the gunwale to prevent rotation of the cover member 15 even if the rod holding tube 12 is rotated.

The cover member may be metal or plastic and will typically be unitary.

In the illustrated embodiment, the present invention includes a friction member 14 located between the gunwale 11 relative to which the rod holder 10 is attached and an underside of the radially extending flange 13. Preferably, the friction member is a substantially planar, annular disc. An opening will normally be provided through the friction member 14 in order to receive the rod holding tube 12.

An upper surface of the friction member will normally abut a lower surface of the radially extending flange on the rod holding tube and a lower surface of the friction member will normally abut an upper surface of the gunwale. In this way, the friction member will typically be sandwiched between the surface and the radially extending flange of the rod holding tube.

The friction member may be provided in a low friction or high friction configuration. Further, one surface of the friction member may be low friction on the opposite surface may be high friction. This will preferably allow movement in particular configurations and/or prevent/minimise movement in other configurations.

Figure 7:
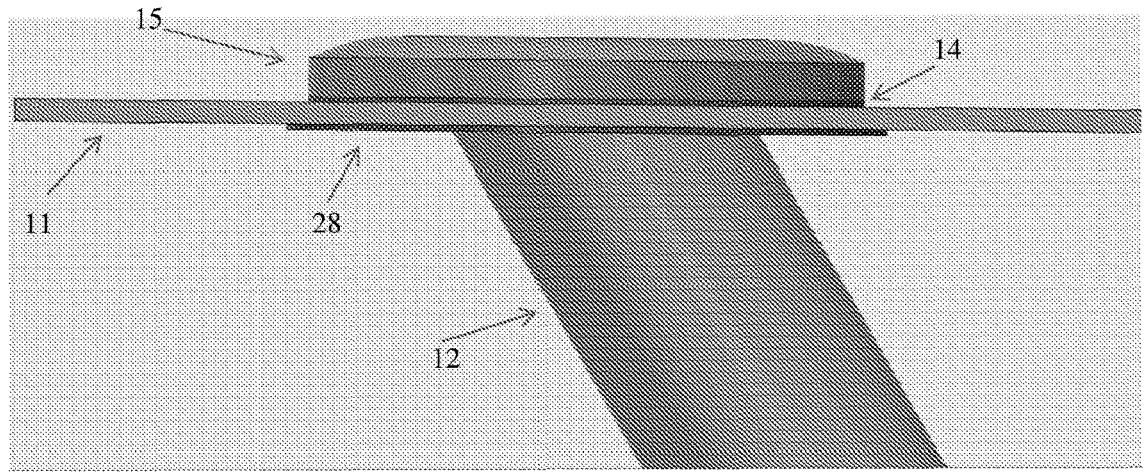
FIG. 7 is a side view of the configuration illustrated in FIG. 6 in the assembled configuration.

One or more openings will normally be provided through the friction member in order to allow the preferred fasteners to pass through the friction member. The friction member will typically be similarly sized to the external diameter of the skirt of the radially extending flange 13 as illustrated best in FIG. 7.

Fasteners may be installed from the lower side upwardly into or through the cover member or alternatively, the fasteners may extend downwardly through the cover members although this is less preferred as it leaves the fasteners exposed. The fasteners will typically have the form of elongate, threaded members such as screws or bolts but other fastening assemblies may be used. The degree to which the preferably threaded fasteners are tightened will affect the ease of rotation of the rod holder with tighter fasteners resulting in a more difficult to rotate assembly and looser fasteners meaning the assembly is more easily rotated but less likely to maintain the orientation once rotated.

The assembly may further include a second member 28 preferably a disc of similar shape and dimensions to the friction member 14 for reinforcing or stabilising the assembly. This second member 28 will preferably be provided to strengthen the assembly. Normally, the second member 28 is located under the gunwale 11. Preferably, the fasteners will extend through the second member 28, through the gunwale 11, through the friction member 14 and into the underside of the cover member 15.

Figure 14:
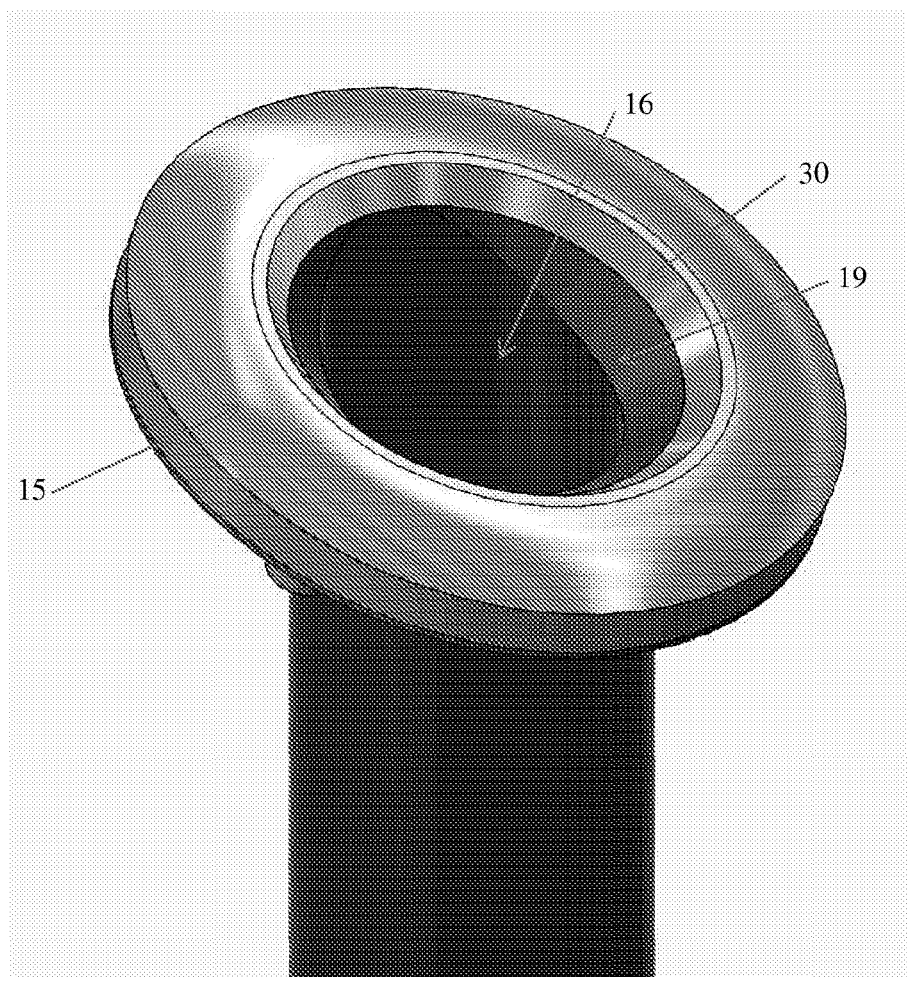
FIG. 14 is an isometric view of a rotatable flush mounted fishing rod holder according to an alternative preferred embodiment of the present invention.

According to the embodiment illustrated in FIG. 14, the cover 15 may be provided with a bevelled or rolled inner edge 30 which allows the cover 15 to be flush with the tapered wall 19 leading to the bore 16 at the upper end of the rod holding tube 12, rather than receiving a portion or step of the radially extending flange of the rod holding tube at an upper end in order to be flush with that portion as illustrated in FIG. 1. The difference is largely one of aesthetics but a rolled or bevelled edge 30 provided on the inner edge of the cover 15 may reduce damage to the bore 16, particularly if the cover 15 is made of a material such as metal and the rod holding tube 12 is made of plastic for example. In this embodiment, the underside of the cover 15 will normally have a stepped profile in order to match the stepped profile of the radially extending flange of the rod holding tube so as to allow rotation of the rod holding tube relative to the cover.

Figures 19, 20:
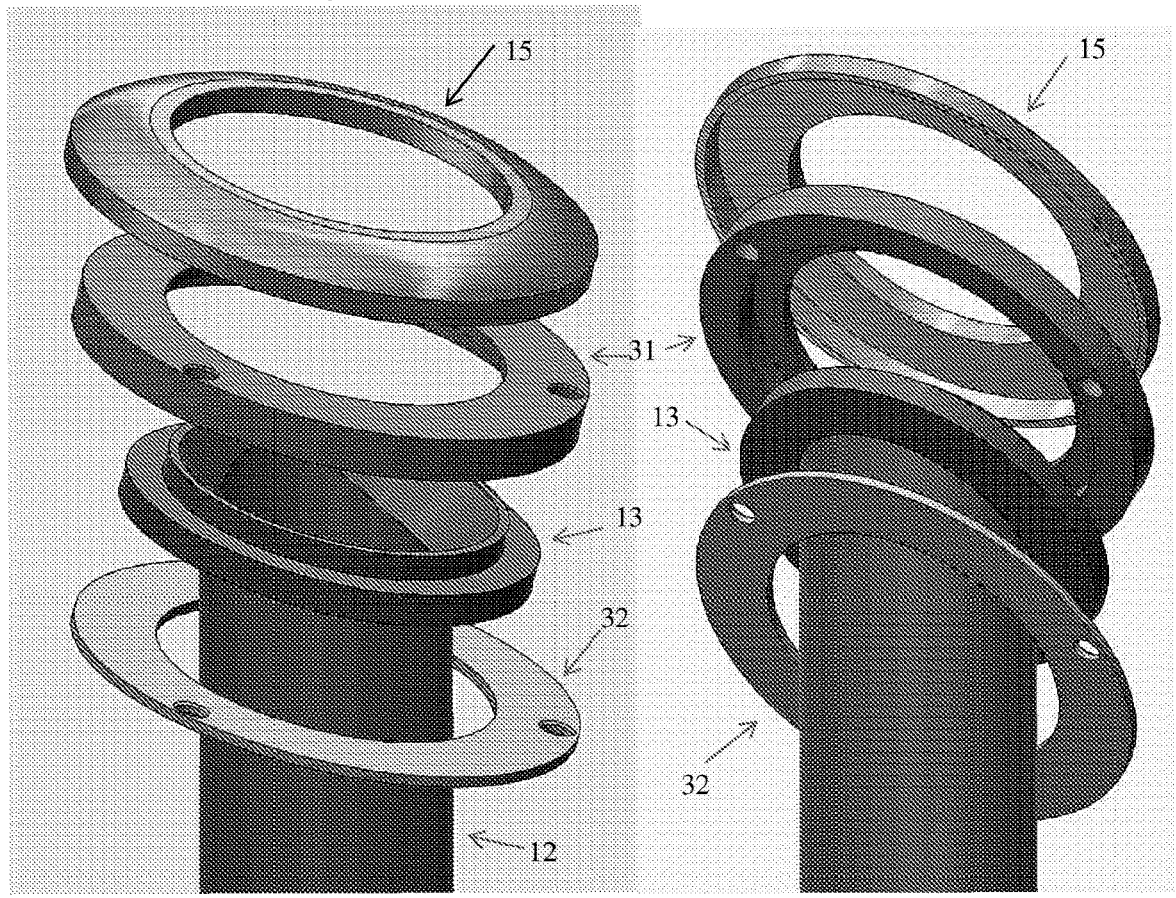
FIG. 19 is an exploded isometric front view of another preferred embodiment of the present invention.
FIG. 20 is a rear view of the configuration illustrated in FIG. 19.

According to an alternative embodiment illustrated in FIGS. 19 and 20, the cover 15 may attach to an annular top member 31 in order to cover the fasteners. As illustrated, the annular top member 31 is provided above the radially extending flange 13 of the rod holding tube and be attached to or mounted to a second member 32 below the surface relative to which the apparatus is mounted. In practice, the annular top member 31 is attached through the surface to the second member 32 below the surface using one or more fasteners extending into or through both the annular top member 31 and the second member 32. The cover 15 is provided in order to cover the annular top member 31 and provide an aesthetically pleasing finish to the flush mounted rod holder and cover the fasteners. Where provided in this form, it is preferred that the underside of the annular top member 31 is stepped to correspond to the shape of the radially extending flange 13 provided on the rod holding tube as illustrated best in FIG. 20. The cover 15 can engage with the annular top member 31 in any way such as by snap fitting over the annular member but preferably, an external thread is provided on the annular top member 31 and a corresponding thread is provided on a lower portion of the inside of the cover 15 to allow the cover to be threaded onto the annular top member 31. This particular embodiment may be advantageous in that the fasteners can be inserted from above the level of the surface rather than below and the cover 15 can simply be removed in order to adjust the force required to rotate the rod holding tube and then replaced when the adjustment is complete. This may provide a more easily accessible and adjustable assembly.

Figures 15, 16:
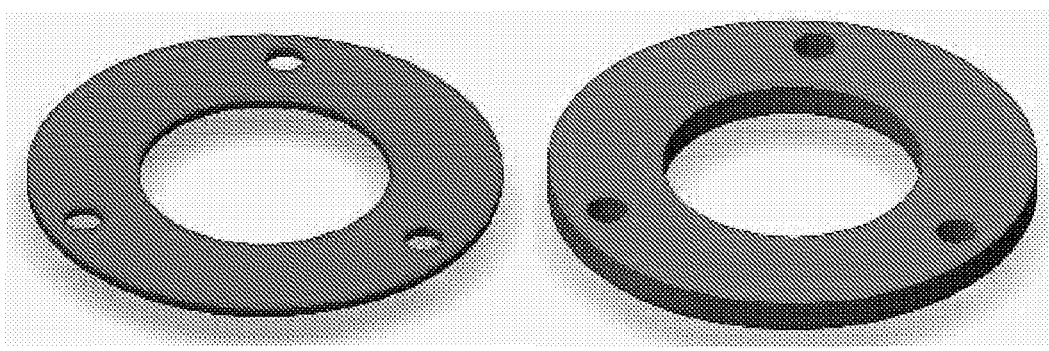
FIG. 15 is an isometric view of an alternative second member configuration.
FIG. 16 is an isometric view of another alternative second member configuration.
Figure 17:
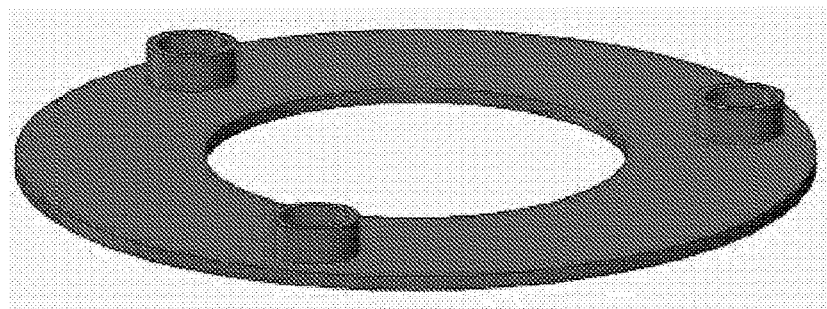
FIG. 17 is an isometric view of a further alternative second member configuration.
Figure 18:
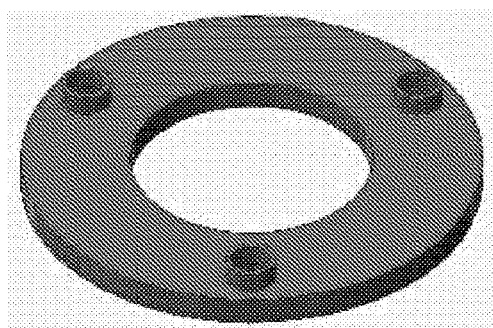
FIG. 18 is an isometric view of still another alternative second member configuration.

According to aspects of the present invention, different thickness friction/tension members may be provided and/or one or more additional annular members of different thicknesses may be provided in order to adjust the clamping force exerted on the rod holding tube in order to adjust the ease of rotation of the rod holding tube. Examples are illustrated in FIGS. 15 to 18. The members may be provided with openings either into the member, as illustrated in FIGS. 17 and 18 or through the member as illustrated in FIGS. 15 and 16 depending upon the configuration of fasteners used and depending upon the required attachment between the members.

Figure 21:
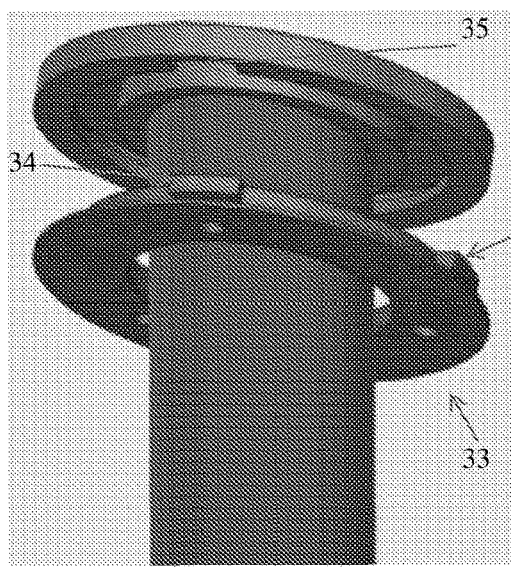
FIG. 21 is an exploded view from the rear of yet another alternative preferred embodiment of the present invention.
Figure 22:
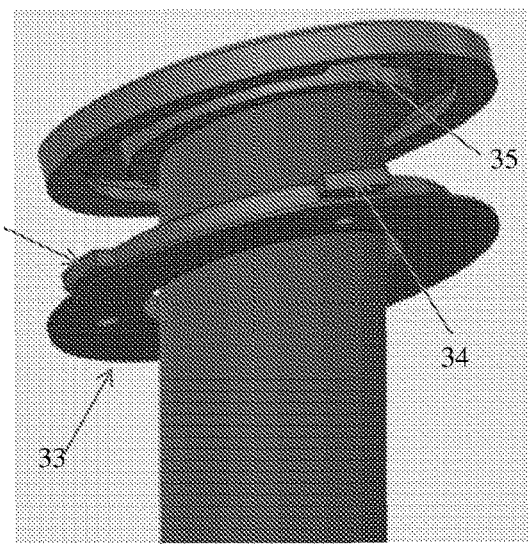
FIG. 22 is a side view of the configuration illustrated in FIG. 21.

In the embodiment of the present invention illustrated in FIGS. 21 and 22, a one-piece rod holding tube 12 with a radially extending flange 13 and with a shaped upper surface can be provided in order that only a single component of the flush mounted rotatable rod holder is provided above the surface. In this way, the rod holding tube 12 is inserted through the mounting opening in the surface until the underside of the radially extending flange 13 abuts an upper side of the surface and the shaped upper surface will provide the flush mounting with the surface and lead to the bore 16 of the rod holding tube 12. In this embodiment, an annular member 33 which is engageable with the radially extending flange 13 of the rod holding tube is provided on an underside of the surface in order to sandwich the surface between the underside of the radially extending flange 13 and the annular member 33.

In this embodiment, the radially extending flange 13 of the rod holding tube is provided with a first part of a bayonet engagement fitting and the annular member 33 is provided with an upstanding neck surrounding the opening of the annular member with a corresponding portion of the bayonet engagement fitting such that the rod holding tube 12 is inserted through the mounting opening in the surface and the annular member 22 is located thereabouts from below with the upstanding neck extending through the mounting opening whereby the upstanding neck and the corresponding portion of the bayonet engagement fitting can engage with the part of the bayonet engagement fitting provided on the underside of the radially extending flange 13 in order to attach the components together. In this preferred embodiment, two components are provided with the components utilising a bayonet engagement fitting to engage with one another whereby the two can be rotated relative to one another to lock and unlock the components from one another.

In this embodiment, the bayonet engagement portion normally includes a one or more tongues 34 extending radially away from the neck received in corresponding openings 35 in an underside of the radially extending flange with an enlarged wall portion separating the openings 35 in the radially extending flange such that the tongues 34 can be inserted into the openings 35 when aligned and to the components can be locked together when the two components are rotated relative to one another such that the tongues 34 are out of alignment with the openings 35.

Figure 23:
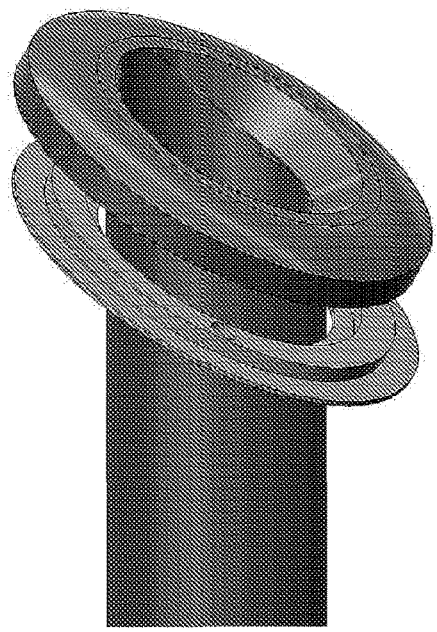
FIG. 23 is an exploded view from the front of still another alternative preferred embodiment of the present invention.
Figure 24:
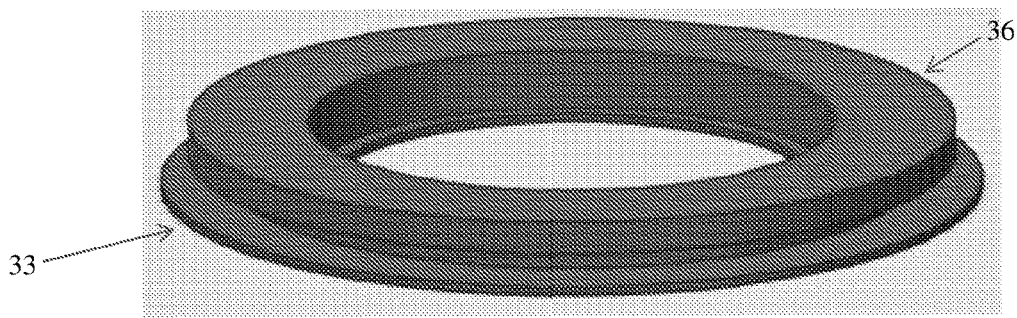
FIG. 24 is an isometric front view of a second member according to one preferred embodiment of the present invention.
Figure 25:
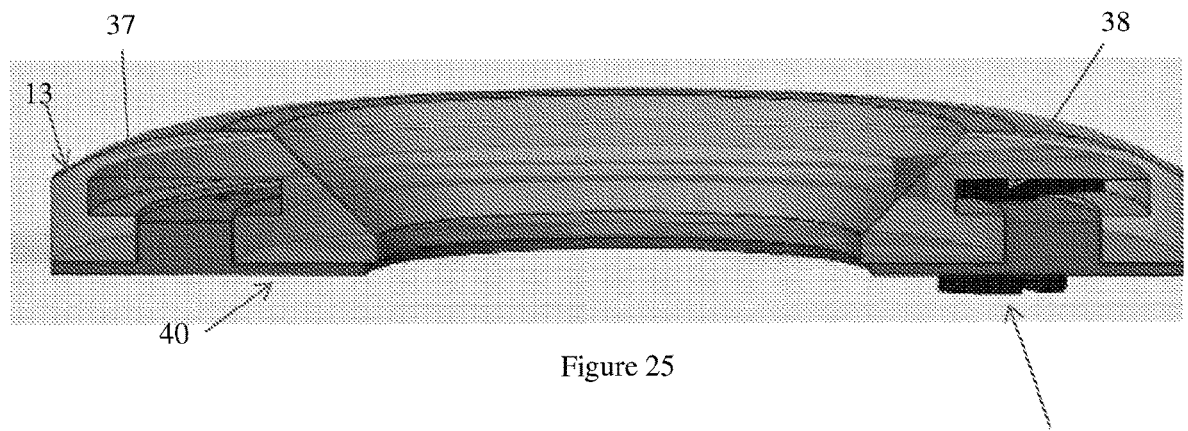
FIG. 25 is a sectional isometric view of a flush mounted fishing rod holder without the rod holding tube according to a preferred embodiment.
Figure 26:
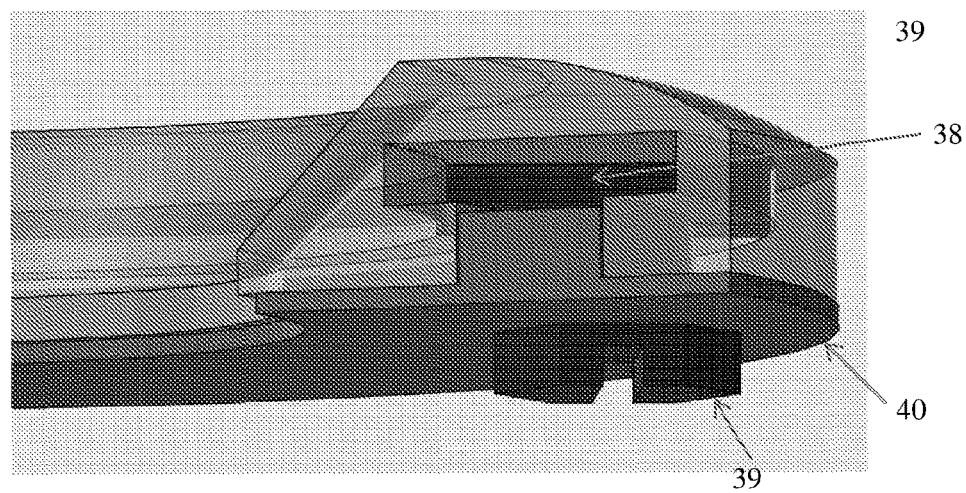
FIG. 26 is a detailed view of one end of the configuration illustrated in FIG. 25.
Figure 27:
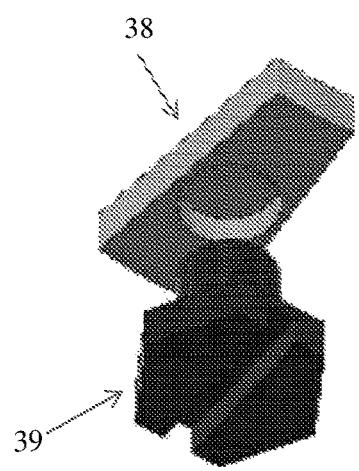
FIG. 27 is a more detailed view of the engagement mechanism illustrated in FIG. 26 in the disengaged condition.
Figure 28:
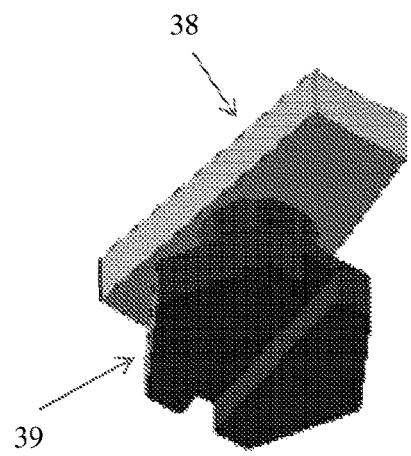
FIG. 28 shows the configuration illustrated in FIG. 27 but in the engaged condition.

According to the alternative embodiment illustrated in FIGS. 23 and 24, the engagement can be provided with a single, radial tongue 36.

In the embodiment illustrated in FIGS. 25 to 28, the underside of the one piece radially extending flange 13 can include a track 37 in order to receive one or more planar plates 38 associated with a threaded fastener 39. The fastener is typically received through an annular member 40 provided on the underside of the surface relative to which the rod holder is mounted and then into the plate 38. This will typically allow a user to not only attach the annular member 40 to the radially extending flange 13 but also adjust the compression force applied in order to adjust the amount of force required to rotate the rod holder in situ. The track 37 has an annular opening smaller in width than the track and into which an annular ridge on the annular member 40 is received.

Figure 29:
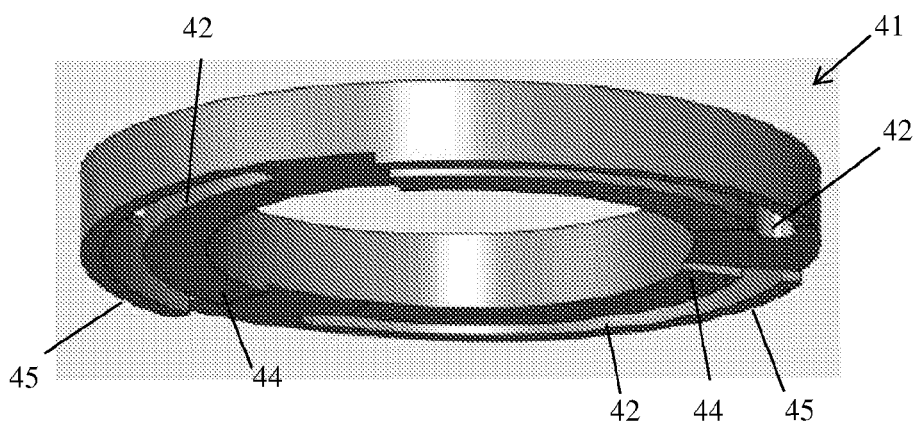
FIG. 29 is an isometric view from below of a tensioning device according to a preferred embodiment of the present invention.
Figure 30:
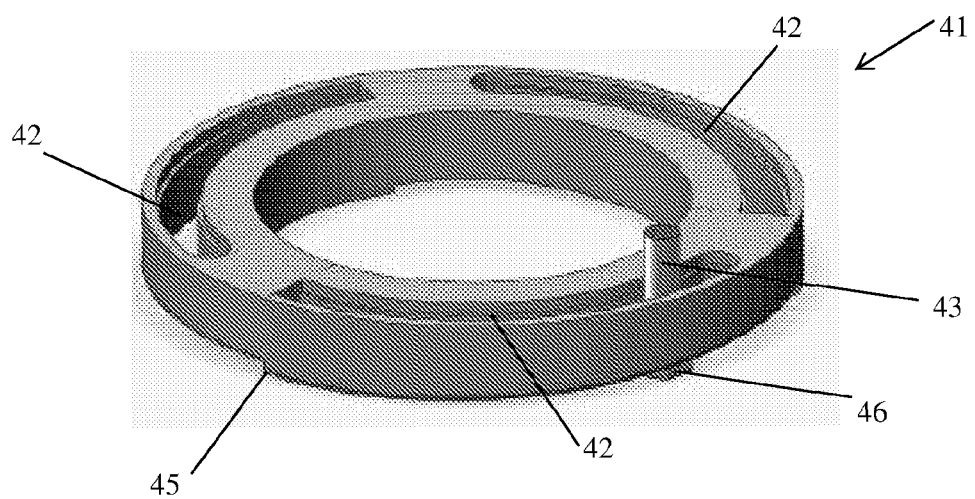
FIG. 30 is an isometric view from above of the tensioning device illustrated in FIG. 29.
Figure 31:
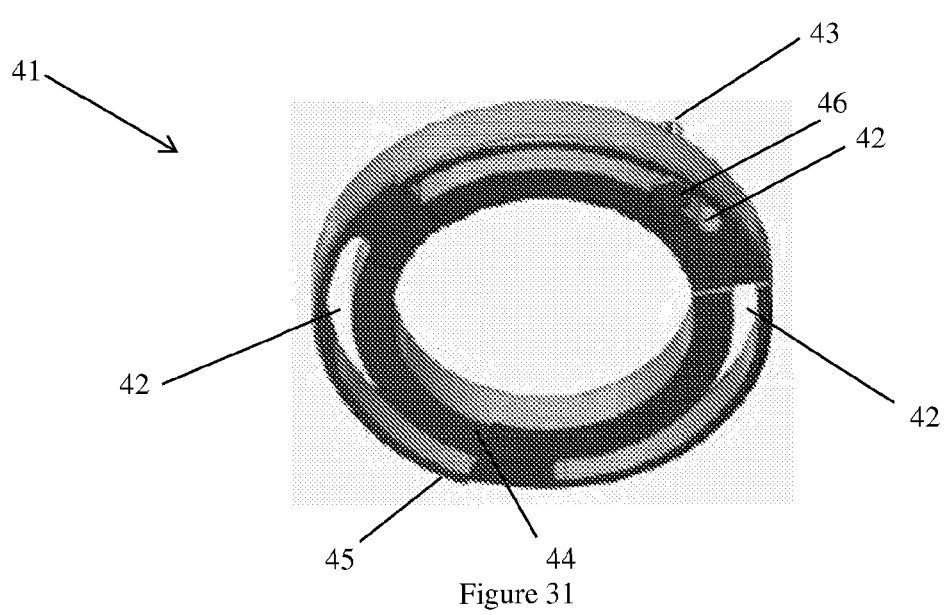
FIG. 31 is a further isometric view from below of the tensioning device illustrated in FIG. 29.

According to the embodiment illustrated in FIGS. 29 to 31, a tensioning element 41 may be provided. The tensioning element 41 illustrated is an annulus which can be rotated in order to adjust the force required to rotate the rod holding tube. In particular, the annulus is provided with a number of slot openings 42 in order to receive fasteners 43 therethrough but still allow rotation of the tensioning element 41 relative to the fasteners 43. According to the illustrated embodiment, an inner inclined surface 44 and an outer inclined surface 45 are provided relative to each slot 42. Typically, the head 46 of the fastener 43 will abut the inclined surfaces 44, 45 such that rotation of the tensioning element 41 in a first direction will result in the head 46 riding on the inclined surfaces 44, 45 to force the fasteners 43 away from the component that the fasteners are attached to, normally a component above the surface, which in turn draws that component closer to the surface and increases the force required to rotate the rod holder (as it will normally be clamped between the component above the surface and the surface), and rotation in the opposite direction results in the heads 46 of the fasteners 43 riding on the inclined surfaces 44, 45 to allow the component that the fasteners 43 are attached to be loosened relative to the surface, decreasing the force required to rotate the rod holder.

Figure 32:
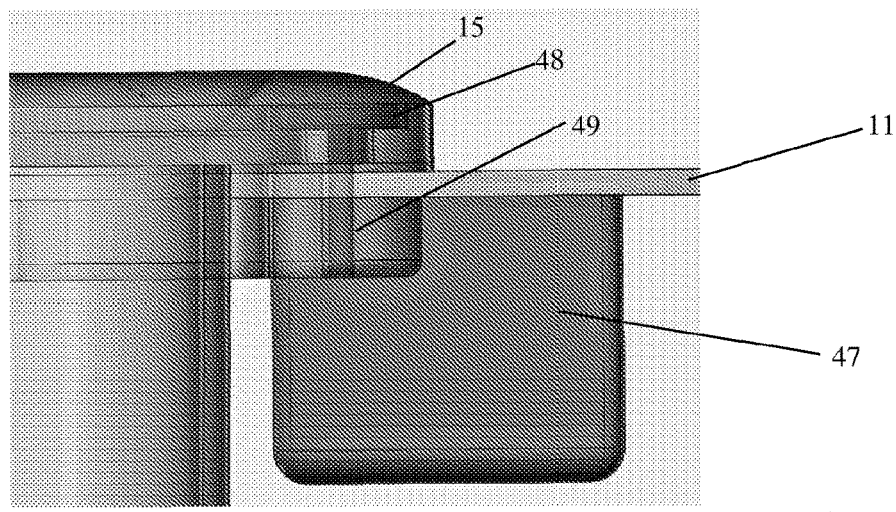
FIG. 32 is a side elevation view of a flush mounted rotating fishing rod holder with motor and drive system according to a preferred embodiment of the present invention.

The flush mount rotatable rod holder also has the scope to be mounted in association with a motorised electric drive system for powered rotation of the rod holder to any position, as illustrated in FIGS. 23 to 34, potentially by a remote control device. It is preferred that an electric motor 47 is provided with an output member shaped to engage with the rod holding tube, and preferably a portion of the radially extending flange 13 of the rod holding tube or cover 15. As shown in FIG. 32, the output member is substantially T-shaped when viewed from the side with a circular upper portion 48 and an elongate arm 49 extending substantially centrally from the circular upper portion 48.

According to a most preferred embodiment, an edge of the circular upper portion 48 of the output member abuts or engages an outer side edge of the radially extending flange of the rod holding tube. The edge of the circular upper portion 48 of the output member and/or the outer side edge of the radially extending flange may have engagement portions provided thereon. In one form, the engagement portions may include one or more teeth but it is anticipated that the engagement between the edge of the preferred circular upper portion of the output member and the outer side edge of the radially extending flange may be friction only. An increased friction portion may be provided on the edge of the preferred circular upper portion of the output member and/or the outer side edge of the radially extending flange.

Figure 33:
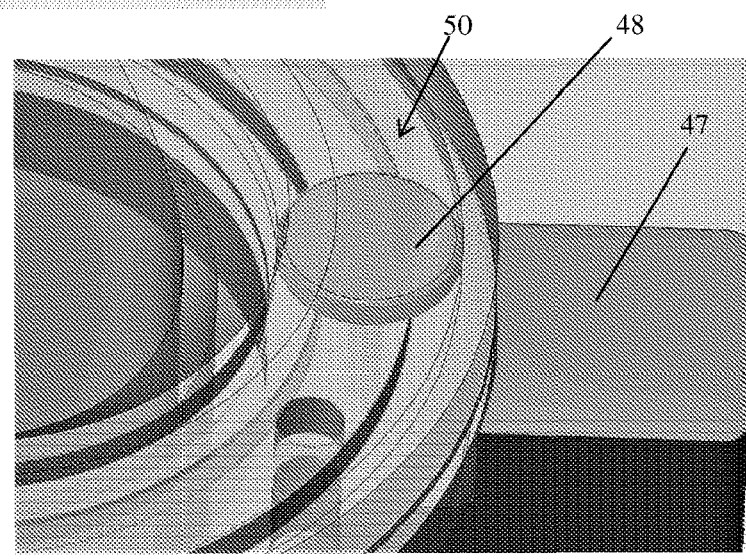
FIG. 33 is a partially transparent view from above of the configuration illustrated in FIG. 32.
Figure 34:
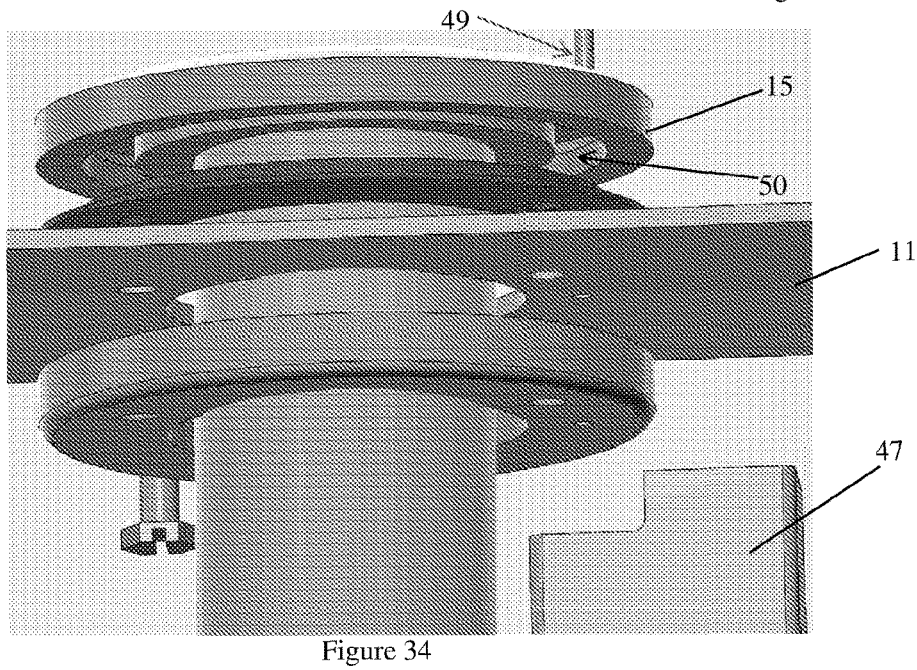
FIG. 34 is an exploded view of the configuration illustrated in FIG. 32.
Figure 47:
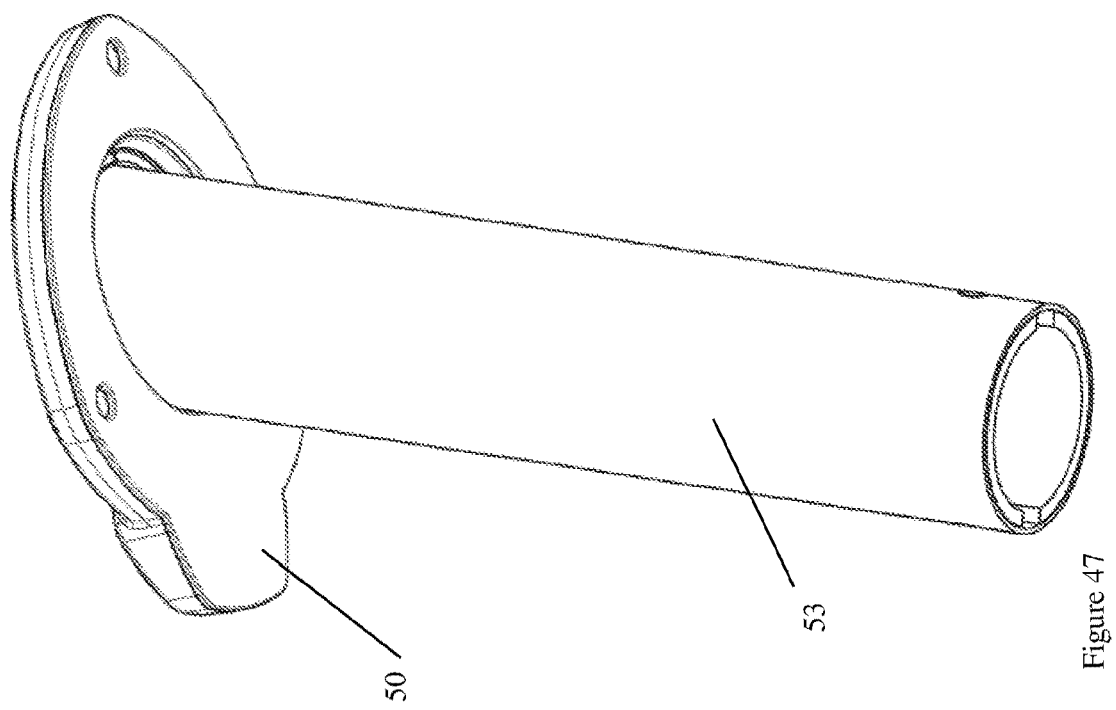
FIG. 47 is an isometric view from below of the rod holder illustrated in FIG. 46.
Figure 46:
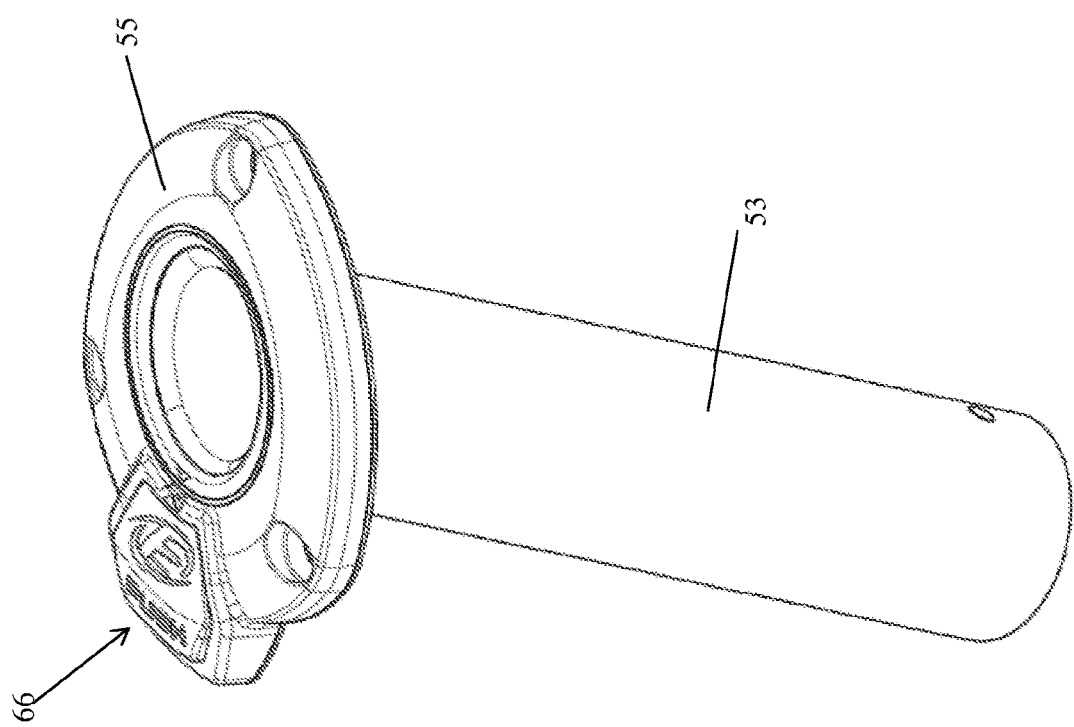
FIG. 46 is an isometric view from above of a further possible configuration of flush mounted rotating fishing rod holder according to a preferred embodiment.
Figure 49:
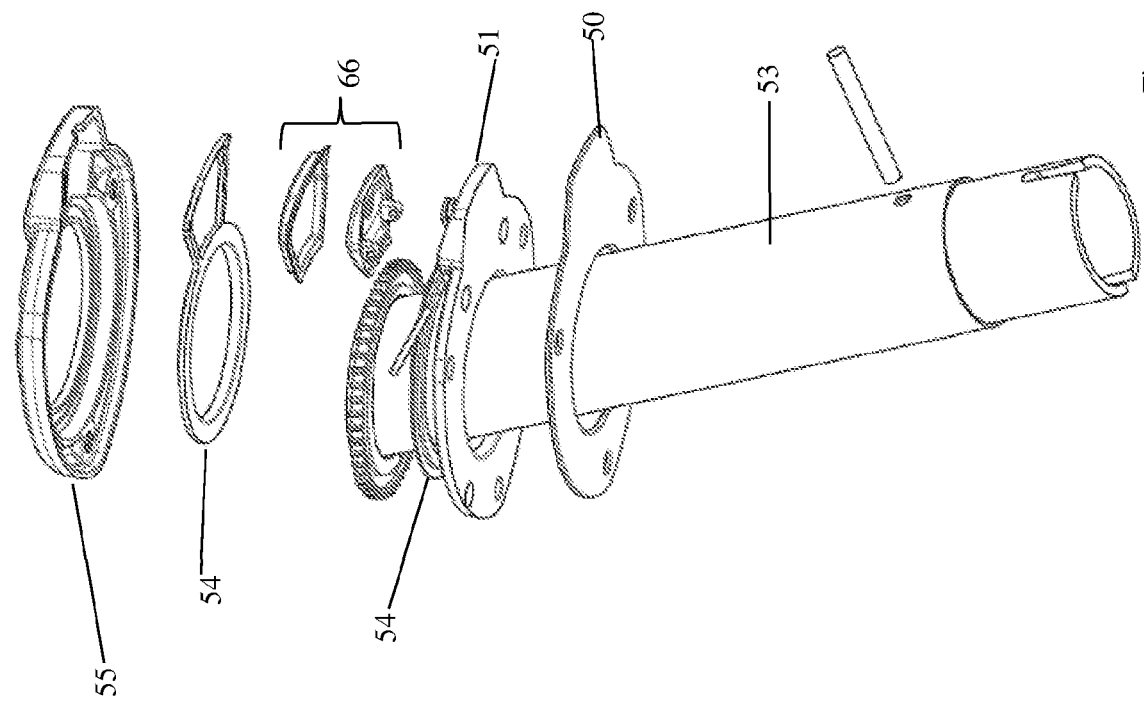
FIG. 49 is an exploded isometric view of the configuration illustrated in FIG. 47.
Figure 48:
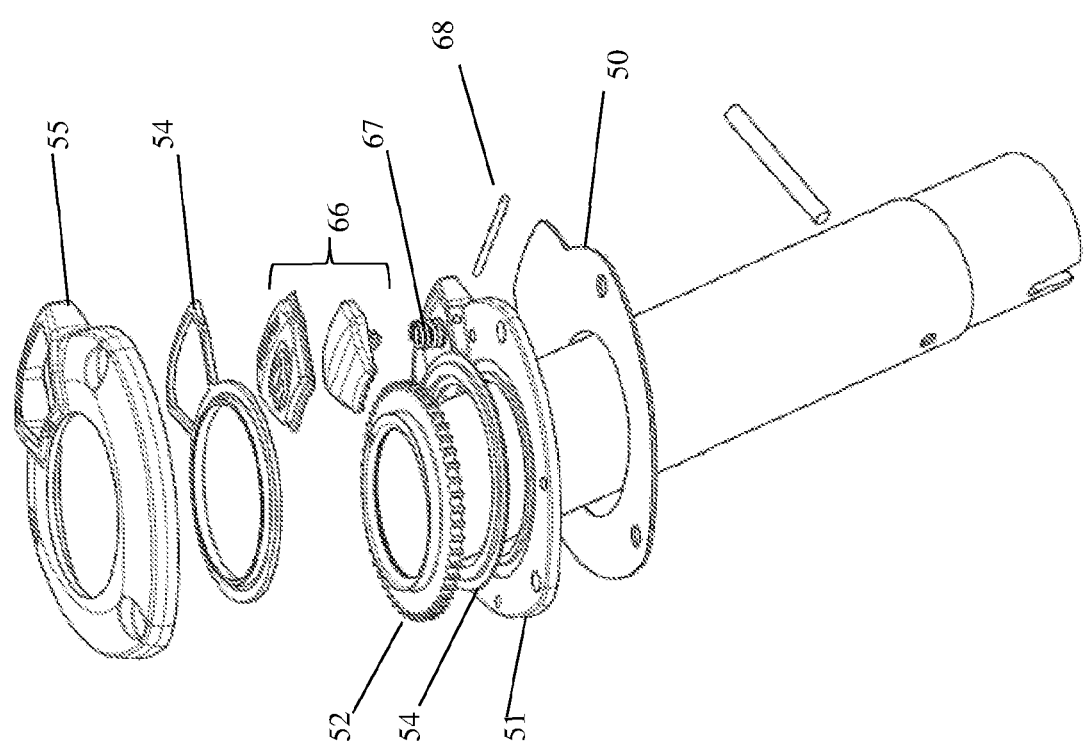
FIG. 48 is an exploded isometric view of the configuration illustrated in FIG. 46

As seen in FIGS. 33 and 34 particularly, the circular upper portion 48 of the output member will also abut a portion of the cover member and indeed, an annular track 50 may be provided or defined between an outer edge of the radially extending flange of the rod holder and an inner surface of the cover whether these components are provided as 2 separate components or as a single component.

Normally, the preferred electric motor is provided below the surface relative to which the rod holder is mounted and the elongate arm extends upwardly through any flanges or annular members provided to locate the upper portion of the output member adjacent to the radially extending flange of the rod holding tube. In use, the elongate arm may extend through and be guided by one or more openings provided in the components of the rod holder.

The manual operation of the rotatable flush mount rod holder is predominately by the fishing rod butt or stock which is inserted into the rod holding tube to the gimbal and a twisting motion made for adjustment, or if allowable, reaching under the gunnel and manually rotating the tube, also by a twisting motion, to any desired position. The rotatable rod holder may also possibly be adjusted by manually gripping the top of the rod holding tube or the flange.

A variety of mechanisms may be used to at least temporarily lock the rotatable mounted fishing rod holder of the present invention in position or orientation.

In the embodiment illustrated in FIGS. 35 to 38 and 71, an annular gasket 50 is provided relative to a gunwale with an annular baseplate 51 located above the gasket 50. A generally annular flange 52 extends transversely from the rod holding tube 53. A low friction annular guide member 54 is provided between the generally annular flange 52 and the annular baseplate 51 and a second low friction annular guide member 54 is provided between the generally annular flange 52 and an upper cover plate 55. The cover plate 55 has an opening 56 substantially centrally located in the cover plate 55 in order to communicate with the rod holding tube 53. In this preferred embodiment, the generally annular flange 52 has a shaped locking detail provided on the circumferential surface of the annular flange 52. In the illustrated particularly preferred embodiment, the locking detail is a scalloped surface having alternating peaks and valleys extending about the circumferential edge of the annular flange 52. A locking lever 57 is provided in association with the cover plate 55 and which is movable between a locked condition (illustrated in FIG. 37) in which a portion of the locking lever 57 engages with the locking detail on the annular flange 52 and an unlocked condition (illustrated in FIG. 38) in which a portion of the locking lever 57 is free from the locking detail. The locking lever 57 will typically be moved manually by an operator in order to release the fishing rod holder for rotation or to lock the position and/orientation of the fishing rod holder as required. The locking lever 57 may be biased into the locked condition but there may be situations where the locking lever 57 is moved to the unlocked condition and temporarily maintained in that position through a latching mechanism (not shown) in order to allow the locking lever to be held in the unlocked condition allowing the fishing rod holder to freely rotate until locked by a user by releasing the latching mechanism.

In a further alternative configuration illustrated in FIGS. 39 to 41, the annular flange 52 may be provided with a number of locking openings 58 and the cover plate 55 may be threadingly attached relative to the baseplate 51 in order to change the separation distance between an underside of the cover plate 55 and the annular flange 52. In this particular configuration, an annular guide 59 is provided above the annular flange 52 with a number of locking pins 60 mounted relative thereto. Each of the locking pins 60 is biased into an unlocked condition by a spring 61 in which the locking pins 60 are free from the opening 58 in the annular flange 52 but when the cover plate 55 is screwed down towards the annular flange 52, at least a portion of the locking pins 60 is forced into engagement with at least one of the openings 58 in the annular flange 52 in order to prevent rotation of the annular flange 52 and thereby prevent rotation of the rod holding tube 53. The cover plate 55 may be provided with an enlarged portion 62 in order to allow a user to more easily lock and unlock the cover plate 62 through rotation which will change the separation distance between the underside of the cover plate 55 and the annular flange 52 to either force the locking pins 60 into the locked condition (as illustrated in FIG. 41) or to allow the pins 60 to be ejected from the at least one opening 58 in the annular flange 52 by the spring 61 in the unlocked condition (as illustrated in FIG. 40).

In yet a further embodiment illustrated in FIGS. 42 to 45, the cover plate 55 may be threadingly attached relative to the baseplate 51 in order to change the separation distance between an underside of the cover plate 55 and the annular flange 52 and a spring steel locking plate 63 is provided between the cover plate 55 and the annular flange 52. In this embodiment, the spring steel locking plate 63 may engage directly with the annular flange 52 through friction or alternatively, one or more protrusions 64 may be provided on an underside of the locking plate 63 such that when the locking plate 63 is forced onto the annular flange by tightening the cover plate 55 relative to the annular flange 52, the one or more protrusions 64 are forced into one or more locking openings or detents 65 provided on a surface of the annular flange 52 in order to lock the rotation (as illustrated in FIG. 44).

In configurations where the cover plate 55 is threadingly attached relative to the baseplate 51 in order to change the separation distance between an underside of the cover plate 55 and the annular flange 52, normally at least partially threaded upstand is provided relative to the baseplate, potentially integrated with the baseplate and a correspondingly at least partially threaded portion is provided on an underside of the cover plate such that the separation between the cover plate on the annular flange can be changed by tightening or loosening the cover plate relative to the baseplate.

Figure 58:
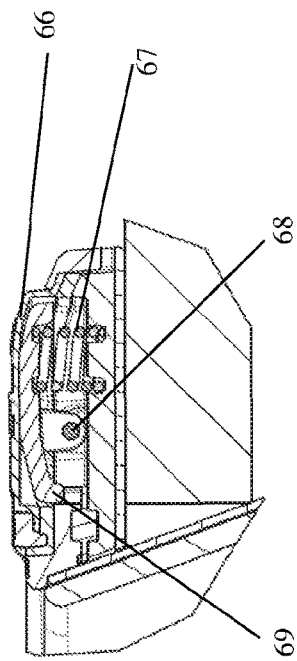
FIG. 58 is a detailed view of the portion illustrated in FIG. 56 and identified as "F".
Figure 56:
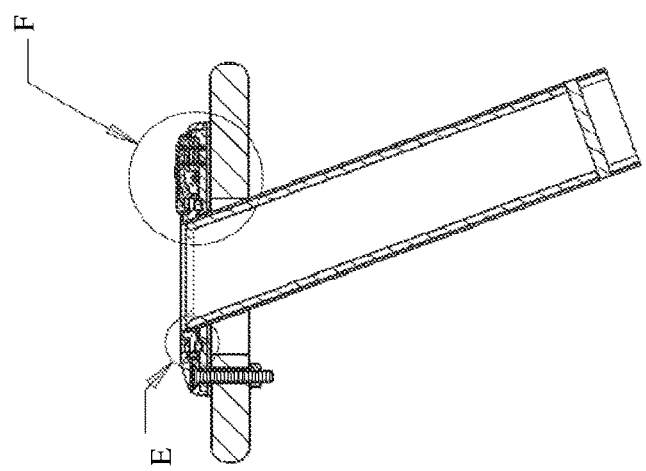
FIG. 56 is a sectional side view of the configuration illustrated in FIG. 55 along line D-D.
Figure 57:
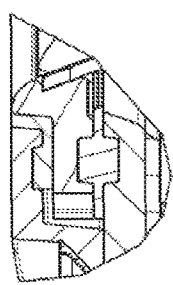
FIG. 57 is a detailed view of the portion illustrated in FIG. 56 and identified as "E".
Figure 55:
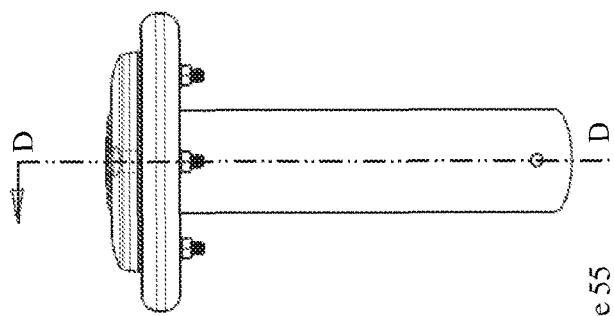
FIG. 55 is a front elevation view of the configuration illustrated in FIG. 46 attached to a gunwale and in the locked condition.
Figure 60:
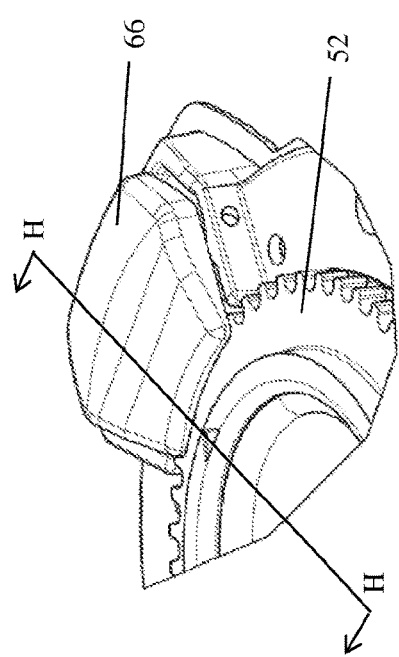
FIG. 60 is a detailed view of the portion illustrated in FIG. 59 and identified as "G".
Figure 61:
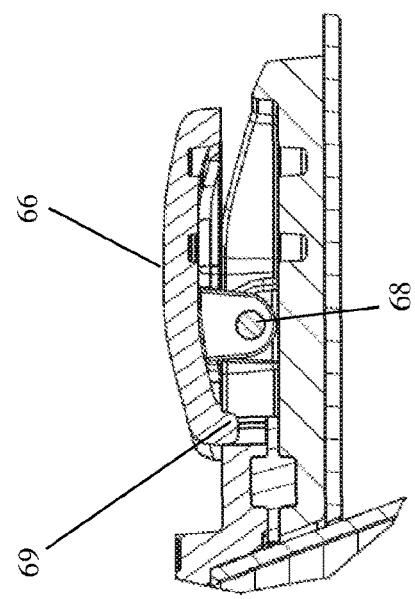
FIG. 61 is a sectional view of the portion illustrated in FIG. 60 along line H-H.
Figure 59:
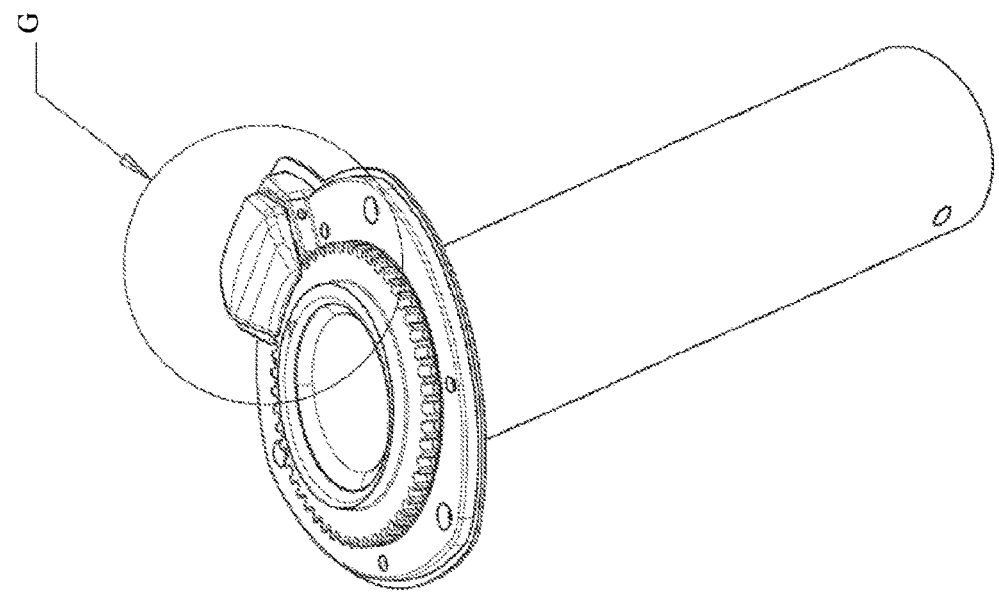
FIG. 59 is an isometric view of the configuration illustrated in FIG. 46 with the cover plate removed.
Figure 65:
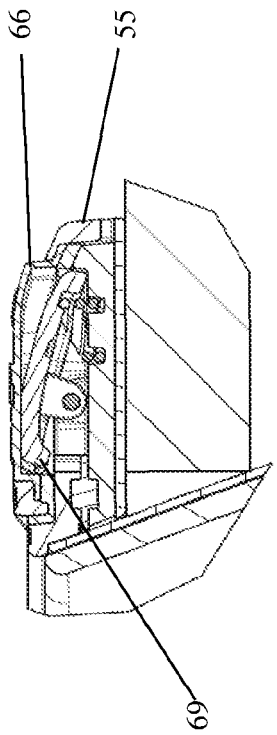
FIG. 65 is a detailed view of the portion illustrated in FIG. 63 and identified as "K".
Figure 63:
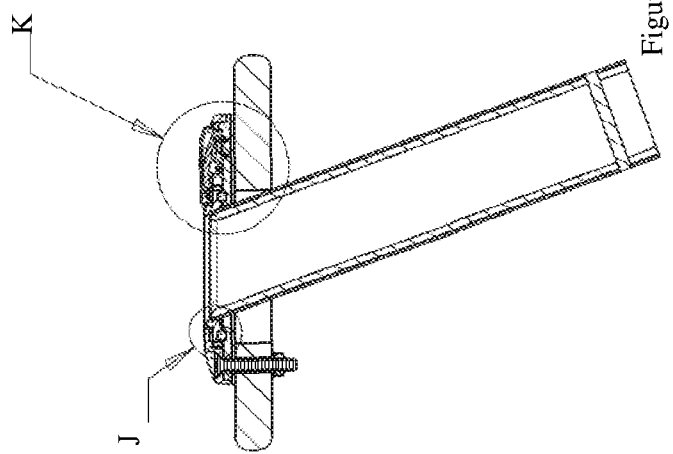
FIG. 63 is a sectional side view of the configuration illustrated in FIG. 55 along line I-I.
Figure 64:
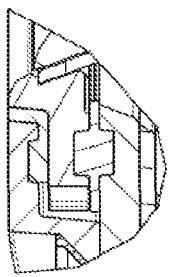
FIG. 64 is a detailed view of the portion illustrated in FIG. 63 and identified as "J".
Figure 62:
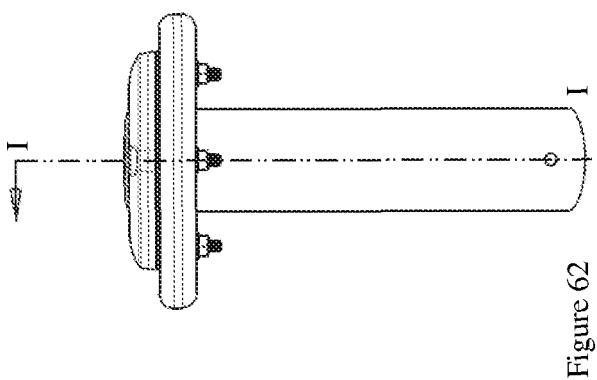
FIG. 62 is a front elevation view of the configuration illustrated in FIG. 46 attached to a gunwale and in the unlocked condition.
Figure 67:
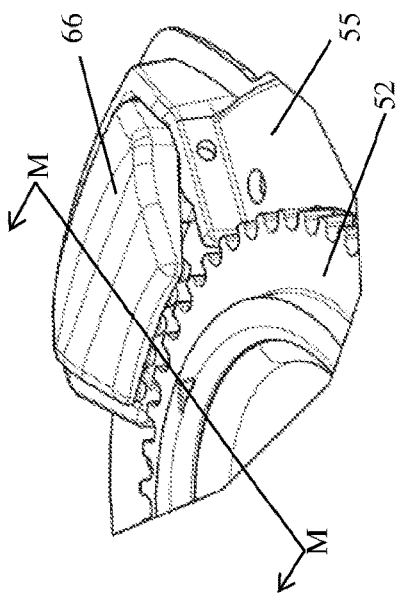
FIG. 67 is a detailed view of the portion illustrated in FIG. 66 and identified as "L".
Figure 68:
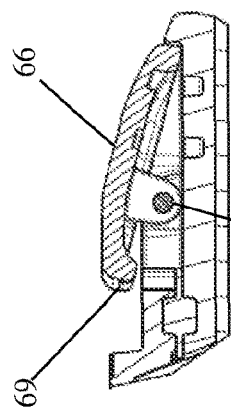
FIG. 68 is a sectional view of the portion illustrated in FIG. 67 along line M-M.
Figure 66:
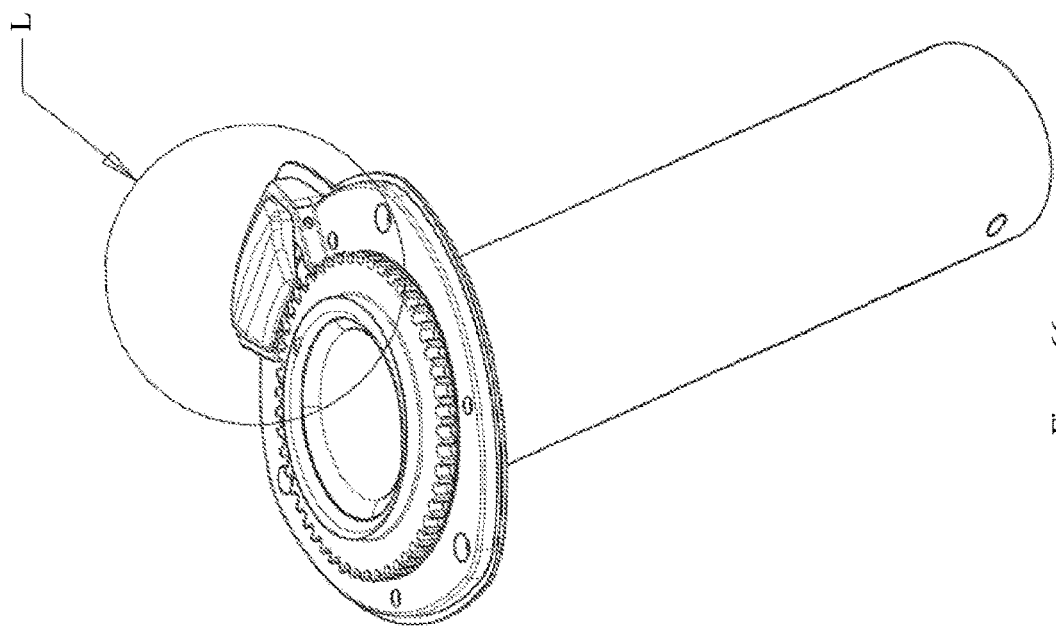
FIG. 66 is an isometric view of the configuration illustrated in FIG. 63 with the cover plate removed.
Figure 71:
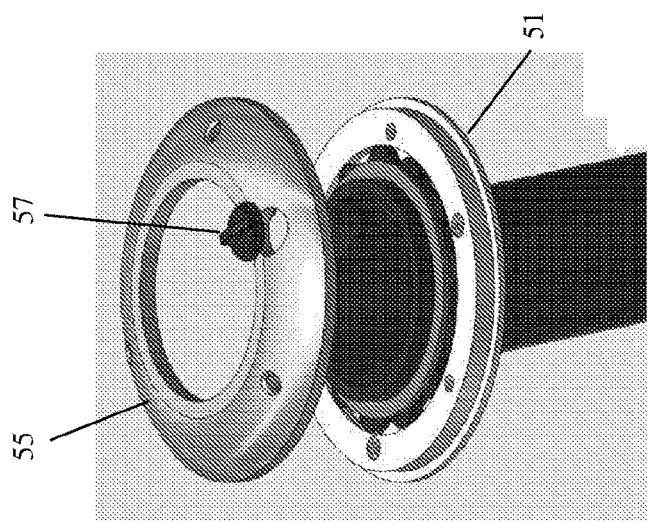
FIG. 71 is an exploded isometric view of a further preferred embodiment of flush mounted rotatable fishing rod holder according to an embodiment of the present invention.
Figure 70:
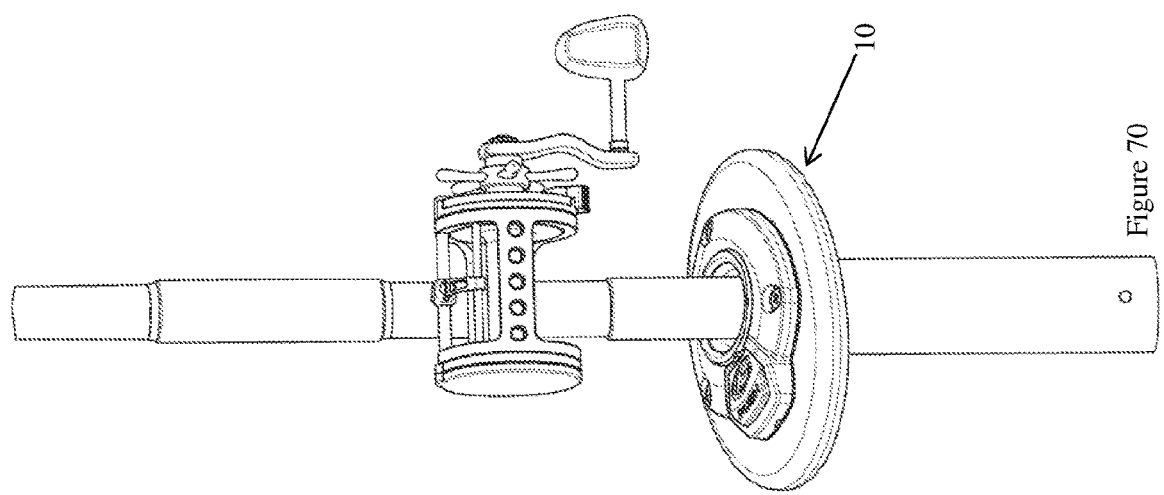
FIG. 70 is an isometric view of the configuration illustrated in FIG. 69 but with the fishing rod rotated 90° to the left.
Figure 69:
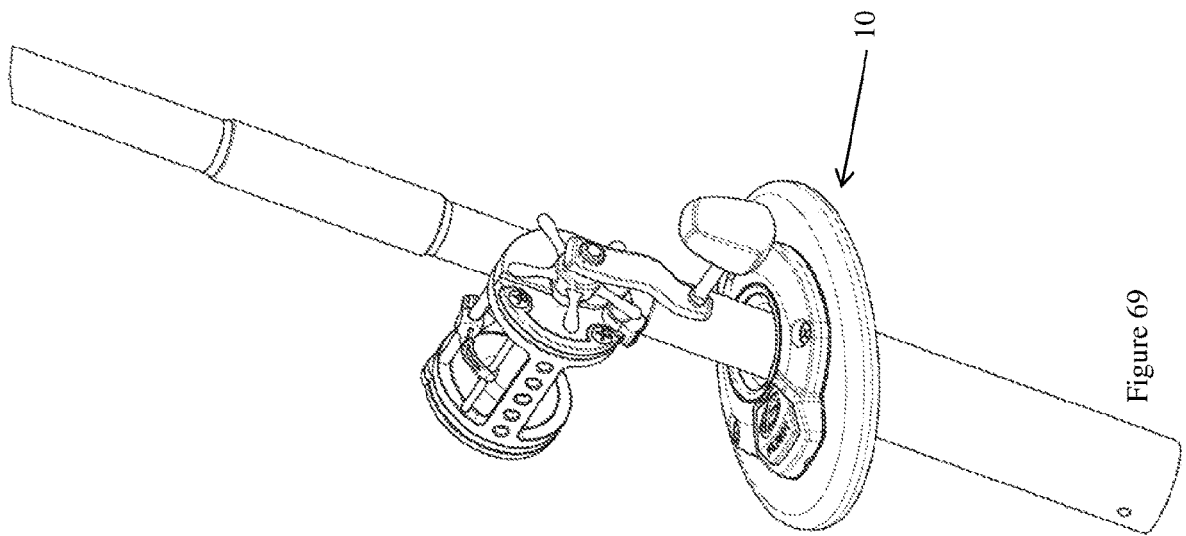
FIG. 69 is an isometric view of a flush mounted rotatable fishing rod holder according to an embodiment of the fishing rod installed.

In an alternative configuration illustrated in FIGS. 46 to 68, the construction of the fishing rod holder may be similar to that described above but instead of a lever, a depressible button 66 is provided. In this embodiment, the button 66 is pivotable about a mounting pin 68 and biased into the locked condition by a spring 67 (illustrated in detail in FIGS. 58 and 61) in which a number of shaped protrusions 69 engage with the scalloped locking detail on the annular flange 52 in order to temporarily lock the fishing rod holder against rotation. The button 66 is mounted for pivotal movement and, the button 66 can be depressed on one edge in order to raise the opposite edge with the shaped protrusions 69 being located on an underside of the button 66 such that depressing one edge of the button 66 also withdraws the shaped protrusions 69 from the locking detail allowing the rod holder to rotate (the unlocked condition, illustrated in detail in FIGS. 65 and 68). In this configuration, the annular flange 52 may have locking openings extending into the body of the flange substantially vertically or alternatively as illustrated, the locking detail is provided as one or more scalloped surfaces having alternating peaks and valleys extending about the at least a portion of the circumferential edge of the annular flange 52.

Benefits of the present invention include when drifting, anchored or trolling, rods can be placed in any functional direction. When fishing in an environment affected by wind, current and tide the rod and rod holder can be adjusted to compensate for these effects. In the fishing procedures of re-rigging, baiting or fish removal, the rod can be rotated inwards to the water craft making these procedures an easier and safer process. When trolling, rods and lines can be separated at various angles to alleviate the problem of tangling. Another advantage of this design is when underway, all rods can be set in a parallel position along the gunnel of the water craft hence solving the problem of rods and rigs protruding out of the water craft.

In the present specification and claims (if any), the word 'comprising' and its derivatives including 'comprises' and 'comprise' include each of the stated integers but does not exclude the inclusion of one or more further integers.

Reference throughout this specification to 'one embodiment' or 'an embodiment' means that a particular feature, structure, or characteristic described in connection with the embodiment is included in at least one embodiment of the present invention. Thus, the appearance of the phrases 'in one embodiment' or 'in an embodiment' in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A rotatable flush mounted fishing rod holder including:
a rod holding tube with an annular flange extending radially from an upper end thereof;
an annular member for abutting of an underside of the annular flange, and adapted to attach to a surface of a watercraft; and
an annular cover member adapted to attach to the surface and the annular member over the annular flange to hold the rod holding tube to the surface but allow rotation of the rod holding tube relative to the surface and the annular cover member,
wherein the rod holding tube has an open end for receiving a rod, wherein the annular flange is located between the annular cover member and the annular member, wherein the rod holding tube defines a longitudinal axis that is rotatable around a perpendicular axis of the annular cover member,
wherein the annular flange is provided at an angle to the longitudinal axis of the rod holding tube defining a rest angle of a fishing rod when placed into the rotatable flush mounted fishing rod holder, and
whereby, in use, the rod received in the rod holding tube extends beyond a distal end of the annular cover member at all rotatable positions.

2. A rotatable flush mounted fishing rod holder as claimed in claim 1 including a laterally extending pin provided across a lower end of the rod holding tube.

3. A rotatable flush mounted fishing rod holder as claimed in claim 1 wherein a low friction member is provided between the annular member and the annular flange.

4. A rotatable flush mounted fishing rod holder as claimed in claim 1 wherein a low friction member is provided between the cover member and the annular flange.

5. A rotatable flush mounted fishing rod holder as claimed in claim 1 further including a releasable locking mechanism to at least temporarily lock the rod holding tube against rotation and to be releasable as required to allow rotation of the rod holding tube.

6. A rotatable flush mounted fishing rod holder as claimed in claim 5 wherein the annular flange has a shaped locking detail provided on at least one surface.

7. A rotatable flush mounted fishing rod holder as claimed in claim 5 wherein a locking actuator is provided in association with the annular cover member and which is movable between a locked condition in which a portion of the locking actuator and/or a member associated with the locking actuator and moved by the locking actuator engages with the locking detail on the annular flange and an unlocked condition in which a portion of the locking actuator and/or a member associated with the locking actuator and moved by the locking actuator is free from the locking detail.

8. A rotatable flush mounted fishing rod holder as claimed in claim 7 wherein the locking actuator is biased into the locked condition.

9. A rotatable flush mounted fishing rod holder as claimed in claim 7 wherein the locking actuator moves about a substantially horizontal axis.

10. A rotatable flush mounted fishing rod holder as claimed in claim 7 wherein the locking actuator moves about a substantially vertical axis.

11. A rotatable flush mounted fishing rod holder as claimed in claim 7 wherein a latching mechanism is provided to temporarily maintain the locking actuator in the unlocked condition.

12. A rotatable flush mounted fishing rod holder as claimed in claim 6 wherein the locking detail includes one or more locking openings extending into the annular flange typically substantially vertically.

13. A rotatable flush mounted fishing rod holder as claimed in claim 6 wherein the shaped locking detail is provided on a circumferential surface of the annular flange.

14. A rotatable flush mounted fishing rod holder as claimed in claim 13 wherein the shaped locking detail is a scalloped surface having alternating peaks and valleys extending at least partially about an edge of the annular flange.

15. A rotatable flush mounted fishing rod holder as claimed in claim 1 wherein the annular cover member is threadingly attached relative to the annular member in order to change the separation distance between an underside of the annular cover member and the annular flange.

16. A rotatable flush mounted fishing rod holder as claimed in claim 15 wherein an annular guide is provided above the annular flange with at least one locking pin mounted relative thereto, each locking pin biased into an unlocked condition in which the locking pin is free from the shaped locking detail in the annular flange but when the annular cover member is screwed down towards the annular flange, at least a portion of at least one locking pin is forced into engagement with shaped locking detail in the annular flange in order to prevent rotation of the annular flange and thereby prevent rotation of the rod holding tube.

17. A rotatable flush mounted fishing rod holder as claimed in claim 15 wherein the annular cover member is provided with an enlarged portion in order to allow a user to more easily lock and unlock the annular cover member through rotation which will change the separation distance between the underside of the annular cover member and the annular flange.

18. A rotatable flush mounted fishing rod holder as claimed in claim 15 wherein the annular cover member is threadingly attached relative to a baseplate in order to change the separation distance between an underside of the annular cover member and the annular flange and a spring steel locking plate is provided such that when the annular cover member is screwed down towards the annular flange, a portion of the spring steel locking plate abuts the annular flange preventing rotation of the annular flange.

19. A rotatable flush mounted fishing rod holder as claimed in claim 15 wherein an at least partially threaded upstand is provided relative to the annular member, and a correspondingly at least partially threaded portion is provided on an underside of the annular cover member such that the separation between the annular cover member on the annular flange can be changed by tightening or loosening the annular cover member relative to the annular member.

20. A rotatable flush mounted fishing rod holder as claimed in claim 1 wherein movement of the rod holding tube is motorised through engagement of a motor with the annular flange.

21. A rotatable flush mounted fishing rod holder as claimed in claim 1, wherein the surface of the watercraft is a gunwale.

22. A rotatable flush mounted fishing rod holder as claimed in claim 1, wherein the annular member comprises one or more apertures for receiving one or more respective receiving assemblies, and wherein the annular cover member comprises the one or more respective receiving assemblies.

* * * * *